United States Patent
Zhu

(10) Patent No.: US 10,845,970 B2
(45) Date of Patent: Nov. 24, 2020

(54) NON-TRANSITORY COMPUTER-READABLE STORAGE MEDIUM FOR STORING PROGRAM, METHOD, AND APPARATUS OF VISUALIZING INFORMATION ON TOPIC FOR CONVERSATION

(71) Applicant: FUJITSU LIMITED, Kawasaki (JP)

(72) Inventor: Wei Zhu, Edogawa (JP)

(73) Assignee: FUJITSU LIMITED, Kawasaki (JP)

( * ) Notice: Subject to any disclaimer, the term of this patent is extended or adjusted under 35 U.S.C. 154(b) by 293 days.

(21) Appl. No.: 15/881,918

(22) Filed: Jan. 29, 2018

(65) Prior Publication Data

US 2018/0232130 A1 Aug. 16, 2018

(30) Foreign Application Priority Data

Feb. 13, 2017 (JP) .................. 2017-024444

(51) Int. Cl.
  *G06F 3/0484* (2013.01)
  *G06F 16/2457* (2019.01)
  (Continued)

(52) U.S. Cl.
  CPC ...... *G06F 3/04845* (2013.01); *G06F 3/04847* (2013.01); *G06F 16/24575* (2019.01); *G06Q 30/0201* (2013.01); *G06Q 30/016* (2013.01)

(58) Field of Classification Search
  CPC .... G06F 3/0481; G06F 3/04886; G06F 3/048; G06F 3/04842; G06F 16/9535;
  (Continued)

(56) References Cited

U.S. PATENT DOCUMENTS

| 2008/0059897 A1* | 3/2008 | Dilorenzo ............... G06F 16/38 715/764 |
| 2010/0161619 A1* | 6/2010 | Lamere .................. G06Q 10/00 707/749 |

(Continued)

FOREIGN PATENT DOCUMENTS

JP 2003-115951 4/2003

OTHER PUBLICATIONS

S Jayashankar, R Sridaran, "Moving Word Cloud From Visual Towards Text Analysis to Endow eLearning", 2016, 3rd International Conference on Computing for Sustainable Global Development (INDIACom), pp. 3493-3498. (Year: 2016).*

(Continued)

*Primary Examiner* — Ariel Mercado
(74) *Attorney, Agent, or Firm* — Fujitsu Patent Canter

(57) ABSTRACT

An apparatus executes a third processing for accepting a third input of a third time point, and displaying a third word group on a first area of a display device, the third word group including a third word which is any of one or more of first words included in first word group stored in a memory, the third word corresponding to the third time point indicated by the third input, and displaying a fourth word group on a second area of the display device, the fourth word group including a fourth word which is any of one or more of second words included in second word group stored in the memory, the fourth word corresponding to the third time point indicated by the third input.

11 Claims, 27 Drawing Sheets

(51) Int. Cl.
*G06Q 30/02* (2012.01)
*G06Q 30/00* (2012.01)

(58) Field of Classification Search
CPC ........ G06F 16/26; G06F 16/345; G06F 40/30; G06F 40/103
See application file for complete search history.

(56) References Cited

U.S. PATENT DOCUMENTS

| | | | |
|---|---|---|---|
| 2011/0282919 A1* | 11/2011 | Sweeney | G06F 3/04842 707/805 |
| 2015/0150023 A1* | 5/2015 | Johnson | G06F 40/30 718/107 |
| 2016/0224940 A1* | 8/2016 | Fulton | G06Q 10/1053 |
| 2016/0267147 A1* | 9/2016 | Seemann | G06F 16/9535 |

OTHER PUBLICATIONS

Coppersmith, Glen & Kelly, Erin "Dynamic Wordclouds and Vennclouds for Exploratory Data Analysis", 2014, Proceedings of the Workshop on Interactive Language Leaning, Visualization, and Interfaces, pp. 22-29. (Year: 2014).*

* cited by examiner

FIG. 2

| CATEGORY | | | DESCRIPTION |
|---|---|---|---|
| PROFILE INFORMATION | HOBBY | PAST AND CURRENT HOBBY | EXTRACT COMMON POINT BY USING SIMILAR WORD DB INSTEAD OF SIMPLE CHARACTER STRING COMPARISON<br>EXAMPLE: DIETING - HEALTH |
| | REGION | CURRENT ADDRESS | EXTRACT COMMON AREA BY USING UNIQUE REGION CODE<br>EXAMPLE: OHTA WARD - SHINAGAWA WARD → TOKYO |
| | | HOMETOWN | |
| | | VISITED PLACE IN PAST | |
| | FAMILY STRUCTURE | PRESENCE OR ABSENCE OF PARENT WHO RECEIVES NURSING CARE | EXTRACT BY COMPARING FAMILY STRUCTURES OF CLIENT AND SALES REPRESENTATIVE WITH EACH OTHER.<br>(INCLUDING PAST, PRESENT, AND FUTURE)<br>EXAMPLE: HAVING ELEMENTARY SCHOOL PUPIL - HAVING UNIVERSITY STUDENT → CHILD-RAISING AND JUNIOR HIGH SCHOOL ENTRANCE EXAMINATION |
| | | SINGLE FAMILY | |
| | | RAISING CHILD OR THE LIKE | |
| | POSSESSED ITEM | CAR AND GOLF CLUB | EXTRACT BY COMPARING POSSESSED ITEM OF CLIENT WITH HOBBY OF SALES REPRESENTATIVE |
| CONCERN INFORMATION | RESPONSE TO TOPIC | TAG INFORMATION | EXTRACT COMMON POINT BY USING SIMILAR WORD DB INSTEAD OF SIMPLE CHARACTER STRING COMPARISON |

FIG. 7

| USER ID | USER WORD ID | KEYWORD | CATEGORY | TIME-SERIES ID | TIME | INTEREST LEVEL |
|---|---|---|---|---|---|---|
| 0001 | 001 | HEALTH | LIFE | 110 | PAST | 4 |
| 0001 | 002 | THEATER | ENTERTAINMENT | 250 | PAST - PRESENT | 5 |
| 0001 | 003 | SOCCER | SPORT | 320 | PRESENT | 4 |
| 0001 | 004 | DRAMA | ENTERTAINMENT | 350 | PRESENT | 4 |
| 0001 | 005 | MLB | SPORT | 490 | PRESENT - FUTURE | 1 |
| 0001 | 006 | OVERSEA EDUCATION | LEARNING | 510 | FUTURE | 3 |
| 0001 | 007 | R&B | ENTERTAINMENT | 550 | FUTURE | 4 |
| ⋮ | ⋮ | ⋮ | ⋮ | ⋮ | ⋮ | ⋮ |

FIG. 9

| CLIENT ID | CLIENT WORD ID | KEYWORD | CATEGORY | TIME-SERIES ID | TIME | INTEREST LEVEL |
|---|---|---|---|---|---|---|
| 0002 | 001 | DRAMA | ENTERTAINMENT | 100 | PAST | 5 |
| 0002 | 002 | INCOME TAX | LIFE | 120 | PAST | 3 |
| 0002 | 003 | DIETING | LIFE | 280 | PAST - PRESENT | 5 |
| 0002 | 004 | SOCCER | SPORT | 350 | PRESENT | 4 |
| 0002 | 005 | PERFORMING ART | ENTERTAINMENT | 400 | PRESENT - FUTURE | 4 |
| 0002 | 006 | MLB | SPORT | 500 | FUTURE | 2 |
| 0002 | 007 | ELEMENTARY SCHOOL | LEARNING | 520 | FUTURE | 3 |
| ... | ... | ... | ... | ... | ... | ... |

FIG. 10

| WORD ID | KEYWORD | SIMILAR WORD CODE | SIMILAR WORD | SIMILARITY LEVEL |
|---|---|---|---|---|
| 000001 | DIETING | 000001 | HEALTH | 30 |
| 000002 | SOCCER | 000002 | WORLD CUP | 50 |
| 000003 | PIANO | 000003 | MUSIC | 30 |
| 000003 | PIANO | 000004 | CONCERT | 40 |
| 000003 | PIANO | 000005 | MUSICAL INSTRUMENT | 50 |
| 000004 | THEATER | 000006 | PERFORMING ART | 50 |
| 000004 | THEATER | 000007 | THEATER | 70 |
| 000005 | BALLET | 000008 | DANCE | 30 |
| 000005 | BALLET | 000009 | THEATER | 50 |
| 000006 | SMART PHONE | 000010 | MOBILE PHONE | 50 |
| 000006 | SMART PHONE | 000011 | OLD STYLE PHONE | 50 |
| 000007 | ENGLISH LESSON | 000012 | LINGUISTICS | 80 |
| ... | ... | ... | ... | ... |

FIG. 11

| REGION CODE | REGION NAME | AREA 1 | AREA 2 |
|---|---|---|---|
| 0001 | OHTA WARD | TOKYO | KANTO |
| 0002 | SHINAGAWA WARD | TOKYO | KANTO |
| 0003 | YOKOHAMA CITY | KANAGAWA | KANTO |
| 0004 | KAWASAKI CITY | KANAGAWA | KANTO |
| 0005 | FUKUOKA CITY | FUKUOKA | KYUSHU |
| ... | ... | ... | ... |
| 1001 | NEW YORK | STATE OF NEW YORK, USA | OVERSEA |
| 1002 | LONDON | ENGLAND, UK | OVERSEA |
| ... | ... | ... | ... |

FIG. 12

| FAMILY CODE | FAMILY MEMBER | KEYWORD |
|---|---|---|
| 001 | SINGLE | WORK, HOBBY, AND MARRIAGE |
| 002 | SPOUSE | BIRTH, HOUSING, WORK, AND INCOME TAX |
| 003 | INFANT | CHILD CARE, BIRTH, KINDERGARTEN, NURSERY, AND HOUSING |
| 004 | ELEMENTARY SCHOOL PUPIL | CHILD-RAISING, CULTURE LESSON, JUNIOR HIGH SCHOOL ENTRANCE EXAMINATION, AND HOUSING |
| 005 | JUNIOR HIGH SCHOOL STUDENT | CHILD-RAISING, CLUB ACTIVITY, HIGH SCHOOL ENTRANCE EXAMINATION, AND CULTURE LESSON |
| 006 | HIGH SCHOOL STUDENT | UNIVERSITY ENTRANCE EXAMINATION, CLUB ACTIVITY, OVERSEAS EDUCATION, AND ENGLISH LESSON |
| 007 | UNIVERSITY STUDENT | EMPLOYMENT, OVERSEAS EDUCATION, ENGLISH LESSON, AND CERTIFICATION COURSE |
| 008 | ELDERLY PARENT | NURSING CARE, PENSION, INHERITANCE, HOSPITAL, AND NURSERY HOME |
| ... | ... | ... |

FIG. 13

| WORD CODE | KEYWORD | CATEGORY | TIME-SERIES ID | TIME | INTEREST LEVEL |
|---|---|---|---|---|---|
| 0001 | FAMILY COMPUTER | ENTERTAINMENT | 100 | PAST | 4 |
| 0002 | SOCCER | SPORT | 200 | PAST - PRESENT | 5 |
| 0003 | GAME | ENTERTAINMENT | 300 | PRESENT | 4 |
| 0004 | MLB | SPORT | 400 | PRESENT - FUTURE | 3 |
| 0005 | R&B | ENTERTAINMENT | 500 | FUTURE | 2 |
| ... | ... | ... | ... | ... | ... |

FIG. 14

| USER ID | USER WORD ID | REGISTERED WORD OF USER | TIME-SERIES ID |
|---------|--------------|-------------------------|----------------|
| 0001 | 005 | WORD 4 | 020 |
| 0001 | 003 | WORD 3 | 200 |
| 0001 | 004 | WORD 1 | 320 |
| 0001 | 001 | WORD 2 | 400 |
| 0001 | 002 | WORD 5 | 550 |
| ... | ... | ... | ... |

FIG. 15

| CLIENT ID | CLIENT WORD ID | REGISTERED WORD OF CLIENT | TIME-SERIES ID |
|---|---|---|---|
| 0002 | 001 | WORD 1 | 100 |
| 0002 | 002 | WORD 2 | 300 |
| 0002 | 003 | WORD 3 | 500 |
| 0002 | 004 | WORD 4 | 050 |
| ... | ... | ... | ... |

FIG. 17

| CLIENT ID | CLIENT WORD ID | REGISTERED WORD OF CLIENT | USER ID | USER WORD ID | REGISTERED WORD OF USER |
|---|---|---|---|---|---|
| 0002 | 001 | DRAMA | 0001 | 004 | DRAMA |
| 0002 | 003 | DIETING | 0001 | 001 | HEALTH |
| 0002 | 004 | SOCCER | 0001 | 003 | SOCCER |
| 0002 | 006 | MLB | 0001 | 005 | MLB |
| ... | ... | ... | ... | ... | ... |

FIG. 19

| PUBLIC WORD ID | PUBLIC REGISTERED WORD | TIME-SERIES ID |
|---|---|---|
| 001 | WORD 5 | 500 |
| 002 | WORD 6 | 300 |
| ... | ... | ... |

NON-TRANSITORY COMPUTER-READABLE STORAGE MEDIUM FOR STORING PROGRAM, METHOD, AND APPARATUS OF VISUALIZING INFORMATION ON TOPIC FOR CONVERSATION

CROSS-REFERENCE TO RELATED APPLICATION

This application is based upon and claims the benefit of priority of the prior Japanese Patent Application No. 2017-024444, filed on Feb. 13, 2017, the entire contents of which are incorporated herein by reference.

FIELD

The embodiments discussed herein are related to a storage medium, a display method, and a display apparatus.

BACKGROUND

A sales representative such as an insurance agent may perform small talk or chat to construct a trusting relationship with a client before talking about business to the client. For example, the sales representative collects information on what the sales representative itself is interested in and discloses the information to the client, in order to unlock the client's heart. Weather, social phenomenon, and current affairs are easy topics and may produce no effect in many cases.

In the related art, the sales representative is forced to make efforts to grope a mutual topic of conversation with the client to further strengthen an intimacy. For this reason, the sales representative may be burdened with psychological and economic strain to collect a wide range of knowledge related to the client for the construction of the trusting relationship with the client. Also, the sales representative attempts to provide a topic matched with a hobby or taste of the client, a region, or the like and provide a topic to find out information of the client.

In view of the above, the sales representative may attempt to use various information technologies to obtain information with regard to the topic to be provided to the client. For instance, in the related art, a certain amount of topic information for conversation is provided by a system of the related art to each calling party during talking on the telephone, in accordance with a static analysis such as gender, age, etc.

Examples of the related art include Japanese Laid-open Patent Publication No. 2003-115951.

SUMMARY

According to an aspect of the invention, a method includes: executing a first processing that includes accepting a first input in which each of one or more of first words is associated with a first time point, and storing a first word group in which each of the one or more of first words is associated with the first time point indicated by the first input in a memory; executing a second processing that includes accepting a second input in which each of one or more of second words is associated with a second time point, and storing a second word group in which each of the one or more of second words is associated with the second time point indicated by the second input in the memory; and executing a third processing that includes accepting a third input of a third time point, and displaying a third word group on a first area of a display device, the third word group including a third word which is any of the one or more of first words included in the first word group stored in the memory, the third word corresponding to the third time point indicated by the third input, and displaying a fourth word group on a second area of the display device, the fourth word group including a fourth word which is any of the one or more of second words included in the second word group stored in the memory, the fourth word corresponding to the third time point indicated by the third input.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 2 is an explanatory diagram for describing an example of a keyword extraction method;

FIG. 7 illustrates an example of a data configuration of concern information in a user information DB;

FIG. 9 illustrates an example of a data configuration of concern information in the client information DB;

FIG. 10 illustrates an example of a data configuration of a similar word DB;

FIG. 11 illustrates an example of a data configuration of region information;

FIG. 12 illustrates an example of a data configuration of family structure information;

FIG. 13 illustrates an example of a data configuration of public keyword information;

FIG. 14 illustrates an example of a data configuration of a word information file of a user;

FIG. 15 illustrates an example of a data configuration of a word information file of a client;

FIG. 17 illustrates an example of a data configuration of a common word information file;

FIG. 19 illustrates an example of a data configuration of a public word information file;

DESCRIPTION OF EMBODIMENTS

In the above-mentioned related art, it is difficult to regularly provide appropriate topics since an interest and a concern of a person (e.g. a customer, a client) may change over time. In other words, even for the same client, the appropriate topic in the past is not necessarily appropriate today or in the future.

For this reason, the sales representative, who uses the system of the related art, may have to unnecessarily struggle to construct the trusting relationship with the client without providing the topic appropriate for the client.

According to one aspect of the present disclosure, provided are technologies easy for a user to obtain information regarding a topic appropriate for a customer.

Hereinafter, details of the supporting technology according to exemplary embodiments of the present disclosure will be described with reference to the drawings. It is noted that the exemplary embodiments of the present disclosure are not intended to restrict the disclosed technology. In addition, the following exemplary embodiments may be appropriately combined within a range without contradictions.

According to the present exemplary embodiments, a case where a sales representative such as an insurance agent acting as a user uses the supporting technology for visualizing a common point with the client will be described as an example.

First Exemplary Embodiment

Figure 1:
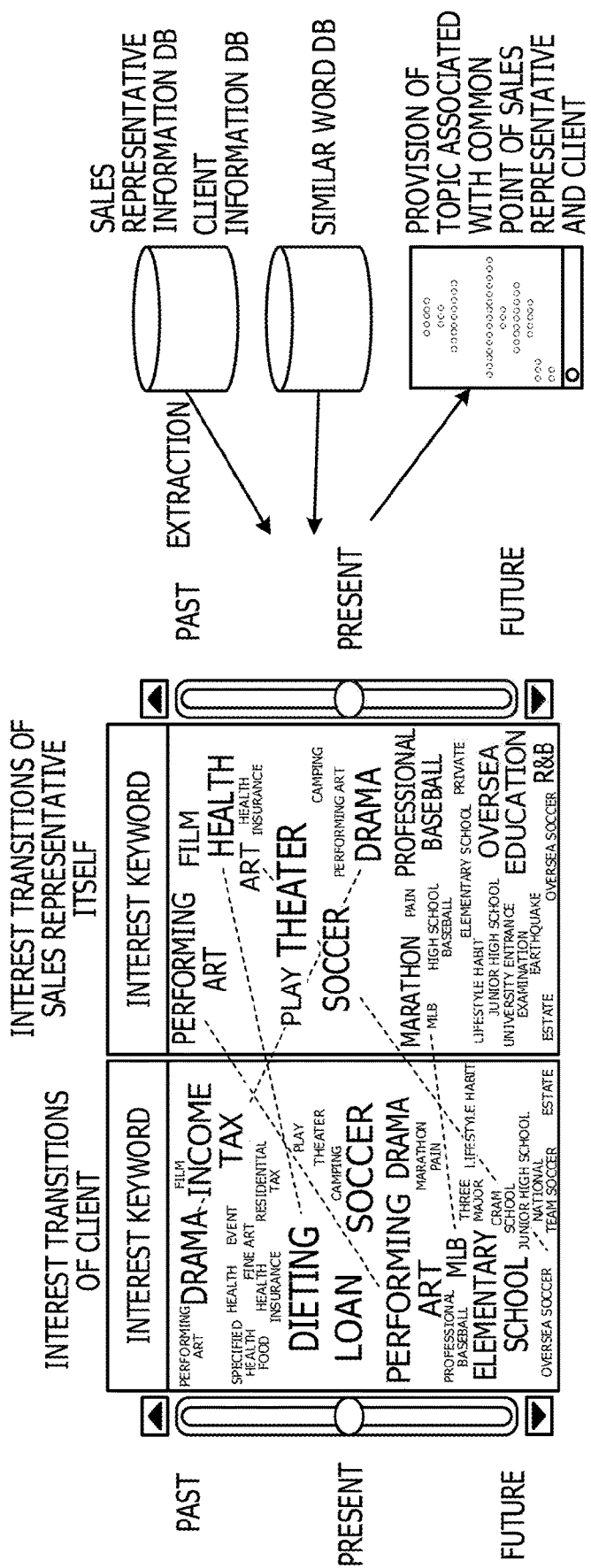
FIG. 1 is an explanatory diagram for describing an outline of a first exemplary embodiment.

FIG. 1 is an explanatory diagram for describing an outline of a first exemplary embodiment. As illustrated in FIG. 1, a display apparatus according to the present exemplary embodiment (a server apparatus 12, see FIG. 4) includes, for example, a sales representative information database (hereinafter, the database may be represented as DB in some cases), a client information DB, and a similar word DB. The sales representative information DB and the client information DB respectively include time-associated information. Herein, the time-associated information includes, for example, interest keywords respectively associated with times such as "drama" (present), "dieting" (present), "soccer" (present), and "theater" (present). The display apparatus according to the present exemplary embodiment extracts a plurality of interest keywords (hereinafter, which may be simply referred to as keywords or words in some cases) respectively associated with the times from the sales representative information DB and the client information DB and registers the extracted interest keywords.

The display apparatus according to the present exemplary embodiment stores the plurality of registered interest keywords extracted from the sales representative information DB in a storage unit as a registered word group of the user (first word group). The display apparatus according to the present exemplary embodiment stores the plurality of registered interest keywords extracted from the client information DB in the storage unit as a registered word group of the client (second word group). The display apparatus according to the present exemplary embodiment displays a display word group of the user (third word group) corresponding to a specified time in the registered word group of the user which is stored in the storage unit. The display apparatus according to the present exemplary embodiment displays a display word group of the client (fourth word group) corresponding to the specified time in the registered word group of the client. For example, as illustrated in FIG. 1, the display apparatus according to the present exemplary embodiment respectively displays the interest keywords of the present set as the specified time among the interest keywords of the past, the present, and the future of the user and the client with respect to a terminal used by the sales representative acting as the user. For this reason, when the display apparatus according to the present exemplary embodiment is used, for example, the user can understand the interest keywords of the user and the client while being associated with the past, the present, and the future. In addition, according to the display apparatus according to the present exemplary embodiment, since it is possible to take into account the change in the interest and the concern of the person over time or the like, the provision of the appropriate topic can be supported.

A weighting setting is performed on the respective words registered as the registered word group of the user and the registered word group of the client in the display apparatus according to the present exemplary embodiment. In this case, the display apparatus according to the present exemplary embodiment can perform displaying while a display mode for words included in the display word group of the user and words included in the display word group of the client is displayed in a display mode in accordance with the set weightings. For example, as illustrated in FIG. 1, the display apparatus according to the present exemplary embodiment can display the interest keywords such as "drama", "dieting", "soccer", and "theater" in character sizes (font sizes) in accordance with the respective weightings. For example, heights of interest levels with respect to the respective words of the user and the client can be used as the weightings (i.e. weighting factors). The interest levels with respect to the respective words of the client can be calculated, for example, by using records of responses by the client with respect to life events and articles.

In addition, in a case where there is a common word between the display word group of the user (third word group) and the display word group of the client (fourth word group), the display apparatus may display an indication regarding the common word included in both of the third word group and the fourth word group. For example, as illustrated in FIG. 1, the indication regarding the common word may be displayed by a link (e.g. a connecting line) indicating a connection between a first position, in which the common word is displayed in the third word group, and a second position, in which the common word is displayed in the fourth word group. As a result, the user can visually check the common point with the client and also easily check whether the common point with the client is common to the common point in the past, the present, or the future.

FIG. 2 is an explanatory diagram for describing an example of a keyword extraction method. As illustrated in FIG. 2, with regard to the interest keyword that is common among the registered word group of the user and the registered word group of the client, the display apparatus according to the present exemplary embodiment extracts the common point by using the similar word DB or the like instead of simple character string comparisons. It is noted that respective items of a keyword extraction method illustrated in FIG. 2 are examples and may include other items.

The profile information includes, for example, information of a hobby, a region, a family structure, a possessed item, and the like. In addition, the concern information includes, for example, information of a client response with respect to the topic. With regard to the client response information, for example, a plurality of keywords associated with the respective times are extracted from the records of the client responses with respect to the topics which are provided when the user has visited the client and stored in the storage unit after being transformed into tag information.

Records with regard to a past hobby and a current hobby can be used as the hobby information, for example. The common point is extracted by using the similar word DB or the like instead of simple character string comparisons in with regard to hobby information. Specifically, for example, "dieting" is extracted as the common point while "dieting" is recognized as a keyword similar to "health".

Records with regard to a current address, a hometown, visited places in the past, and the like can be used as the region information, for example. A common area is extracted by using a unique region code, for example. Specifically, for example, "Tokyo" is extracted as the common area from "Ohta Ward" and "Shinagawa Ward" with regard to the region information.

Records of the presence or absence of a parent who receives nursing care, a single family, child-raising, and the like can be used as the family structure information, for example. The family structures of the client and the sales representative are compared with each other, and the common points including the past, the present, and the future are extracted with regard to the family structure information, for example. Specifically, keywords such as, for example, "child-raising" and "junior high school entrance examination" are extracted as the common points including the past, the present, and the future from information "having elementary school pupil" and "having university student".

Records of possessed items such as "car" and "golf club" that the sales representative sees when visiting the client can be used as the possessed item information, for example. For example, the possessed items of the client and the hobby of the sales representative are compared with each other to extract he common points with regard to the possessed item information.

Figure 3:
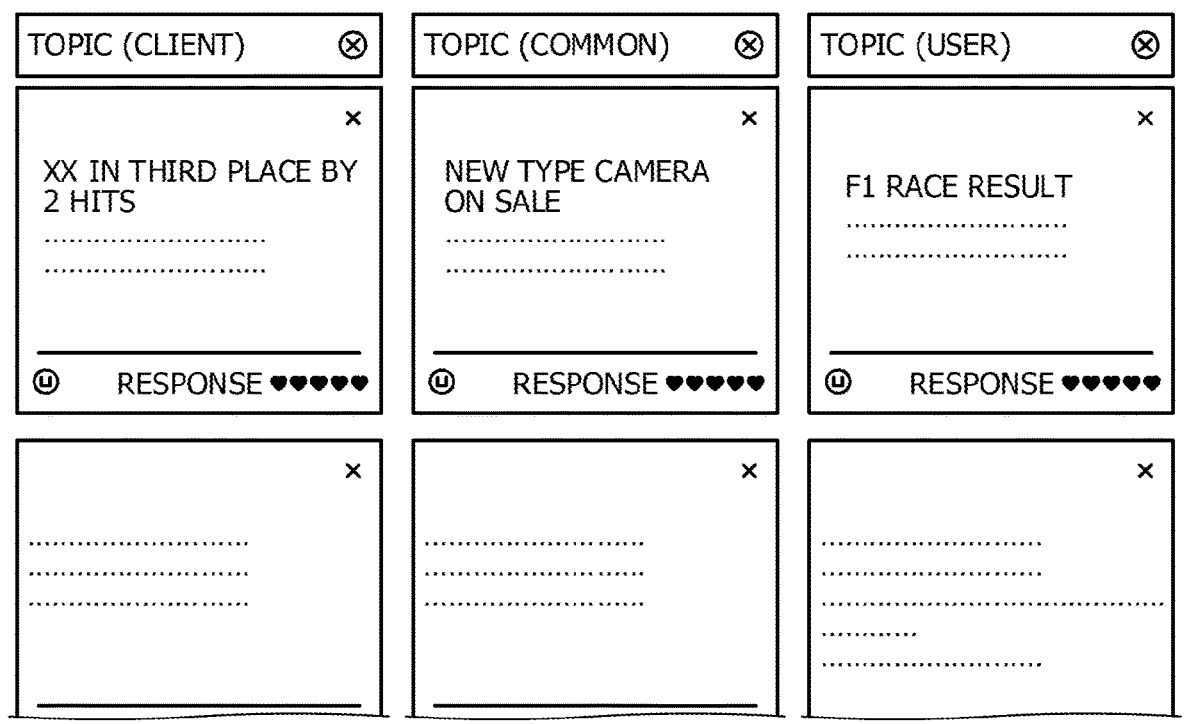
FIG. 3 illustrates an example of a topic provision screen.

It is noted that, when any one of the keywords is selected on the screen illustrated in FIG. 1, the display apparatus according to the present exemplary embodiment can display contents in accordance with the selected keyword. FIG. 3 illustrates an example of a topic provision screen. As illustrated in FIG. 3, the display apparatus according to the present exemplary embodiment searches the contents by using a keyword or performs an archive search by using the keyword and time information and displays the topic provision screen in accordance with a search result. As a result, the sales representative can provide the topic associated with the common point with respect to the client to the client by checking the mutual interest or the common point, for example.

System Configuration Example

Figure 4:
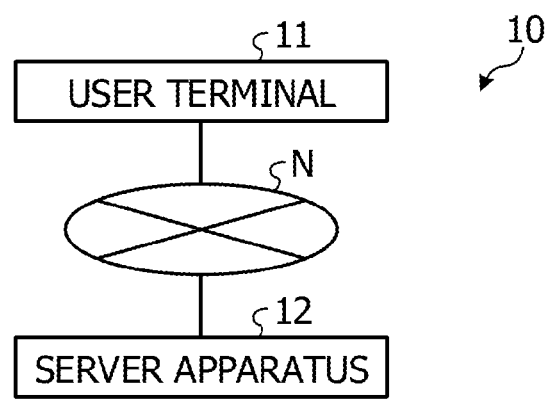
FIG. 4 illustrates an example of a schematic configuration of a display system according to the first exemplary embodiment.

Next, an example of a display system 10 according to the first exemplary embodiment will be described. FIG. 4 illustrates an example of a schematic configuration of a display system according to the first exemplary embodiment. As illustrated in FIG. 4, the display system 10 includes a user terminal 11 and the server apparatus 12. According to the present exemplary embodiment, the server apparatus 12 corresponds to the display apparatus.

The display system 10 is a system that displays the keywords in a time-series manner to visualize the common point. The user terminal 11 is connected to the server apparatus 12 via a network N in a communicable manner. Any type of communication network, irrespective of being wired or wireless, such as a local area network (LAN), a virtual private network (VPN), or a mobile communication network can be adopted as a mode of the network N described above.

The user terminal 11 is an apparatus possessed by the sales representative acting as the user. For example, the user terminal 11 is a mobile terminal apparatus such as a smart phone or a tablet terminal. The sales representative accesses the server apparatus 12 by using the user terminal 11, and it is possible to display the profile information of the client or the like. Furthermore, the sales representative extracts the keyword associated with the time from the profile information of the client or the like to be displayed, so that it is also possible to visually check the common point.

The server apparatus 12 is a computer that provides the user with a display service for displaying a plurality of words respectively associated with the times and visualizing the common point. The display service may be provided by a single computer or may be provided by a computer system constituted by a plurality of computers. It is noted that, according to the present exemplary embodiment, a case where the display service is provided by the single server apparatus 12 will be described as an example.

Server Apparatus

Figure 5:
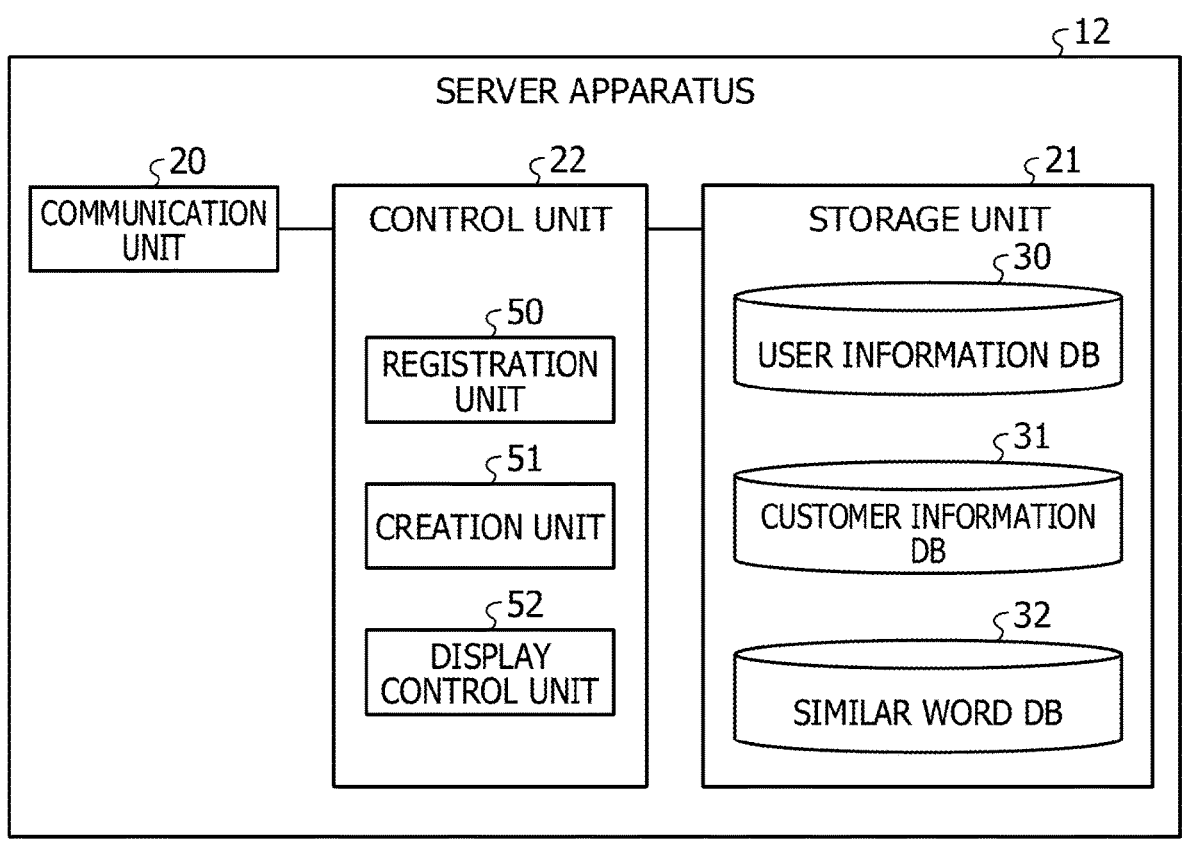
FIG. 5 illustrates an example of a configuration of a server apparatus.

Next, a configuration of the server apparatus 12 according to the first exemplary embodiment will be described. FIG. 5 illustrates an example of a configuration of a server apparatus. As illustrated in FIG. 5, the server apparatus 12 includes a communication unit 20, a storage unit 21, and a control unit 22. It is noted that the server apparatus 12 may also include various function units of a related art computer such as, for example, various input devices and audio output devices in addition to the function units illustrated in FIG. 5.

The communication unit 20 is an interface that performs a communication control with another apparatus. The communication unit 20 transmits and receives various information with respect to the other apparatus via the network N. The communication unit 20 can be realized, for example, by a network interface card (NIC) or the like.

The storage unit 21 is a storage device such as a hard disk drive (HDD), a solid state drive (SSD), or an optical disk. It is noted that the storage unit 21 may be a random access memory (RAM) or a data-rewritable semiconductor memory such as a flash memory. In addition, the storage unit 21 may be an external server that stores and provides data.

The storage unit 21 stores various programs. The storage unit 21 also stores various data used in the various programs and information used for processing in the control unit 22. The storage unit 21 includes a user information DB 30, a client information DB 31, and a similar word DB 32. For example, the user information DB 30 and the client information DB 31 store respective time-associated information such as profile information and concern information. In addition, the similar word DB 32 stores various information such as, for example, region information and family structure information.

Figure 6:
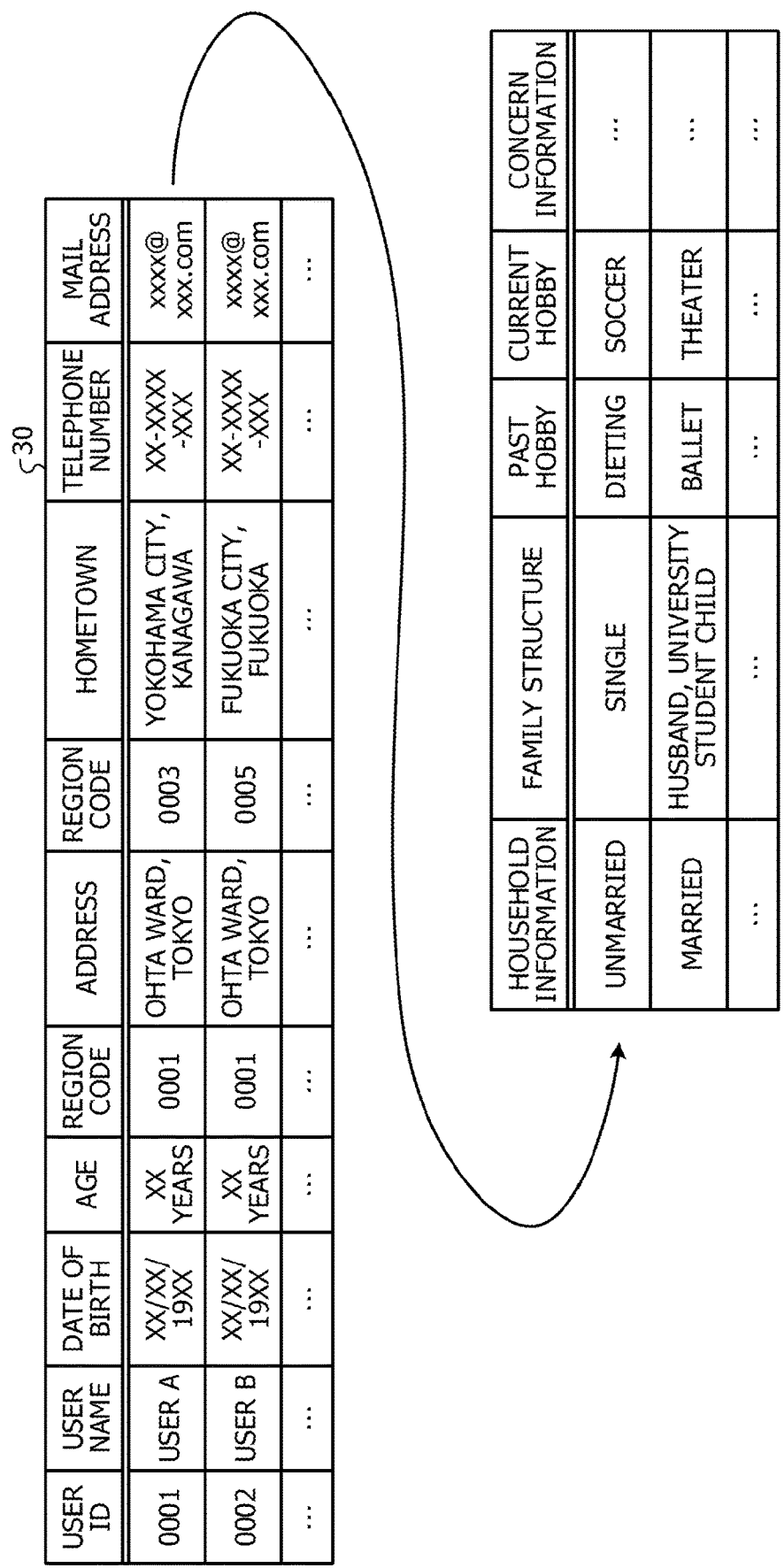
FIG. 6 illustrates an example of a data configuration of a user information DB.

The user information DB 30 will be described. FIG. 6 illustrates an example of a data configuration of the user information DB 30. As illustrated in FIG. 6, the user information DB 30 includes items such as, for example, a user identification (ID), a user name, a date of birth, an age, a region code (address), and an address. The user information DB 30 also includes items such as, for example, a region code (hometown), a hometown, a telephone number, a mail address, household information, a family structure, a past hobby, a current hobby, and concern information. The user information DB 30 stores one record for each user ID, for example. The user ID is an identifier that uniquely identifies the user. The region code (address) is an identifier that identifies a region corresponding to the address. The region code (hometown) is an identifier that identifies a region corresponding to the hometown. The household information is information for distinguishing whether the person is unmarried or married. It is noted that the respective items of the user information DB 30 illustrated in FIG. 6 are examples, and the user information DB may also include other items.

Here, the concern information of the user information DB 30 will be described with reference to FIG. 7. FIG. 7 illustrates an example of a data configuration of the concern information of the user information DB. As illustrated in FIG. 7, the concern information of the user information DB includes items such as, for example, the user ID, a user word ID, a keyword, a classification, a time-series ID, the time, and the interest level. The user word ID is an identifier that uniquely identifies the interest keyword of the user. The keyword is information indicating the interest keyword of the user. The classification is information indicating the classification to which the keyword belongs. The time-series ID is an identifier that identifies the "time" such as the past, the present, and the future associated with the keywords. For example, information obtained from a time stamp of the file or the like can be used as the time-series ID. The time is information of the time indicated by the time-series ID associated with the keyword. The interest level is information indicating the interest level of the user with respect to the keyword. It is noted that FIG. 7 illustrates an example of a case where the concern information of a user A is stored. In addition, the respective items of the concern information illustrated in FIG. 7 are examples, and the concern information may also include other items.

Figure 8:
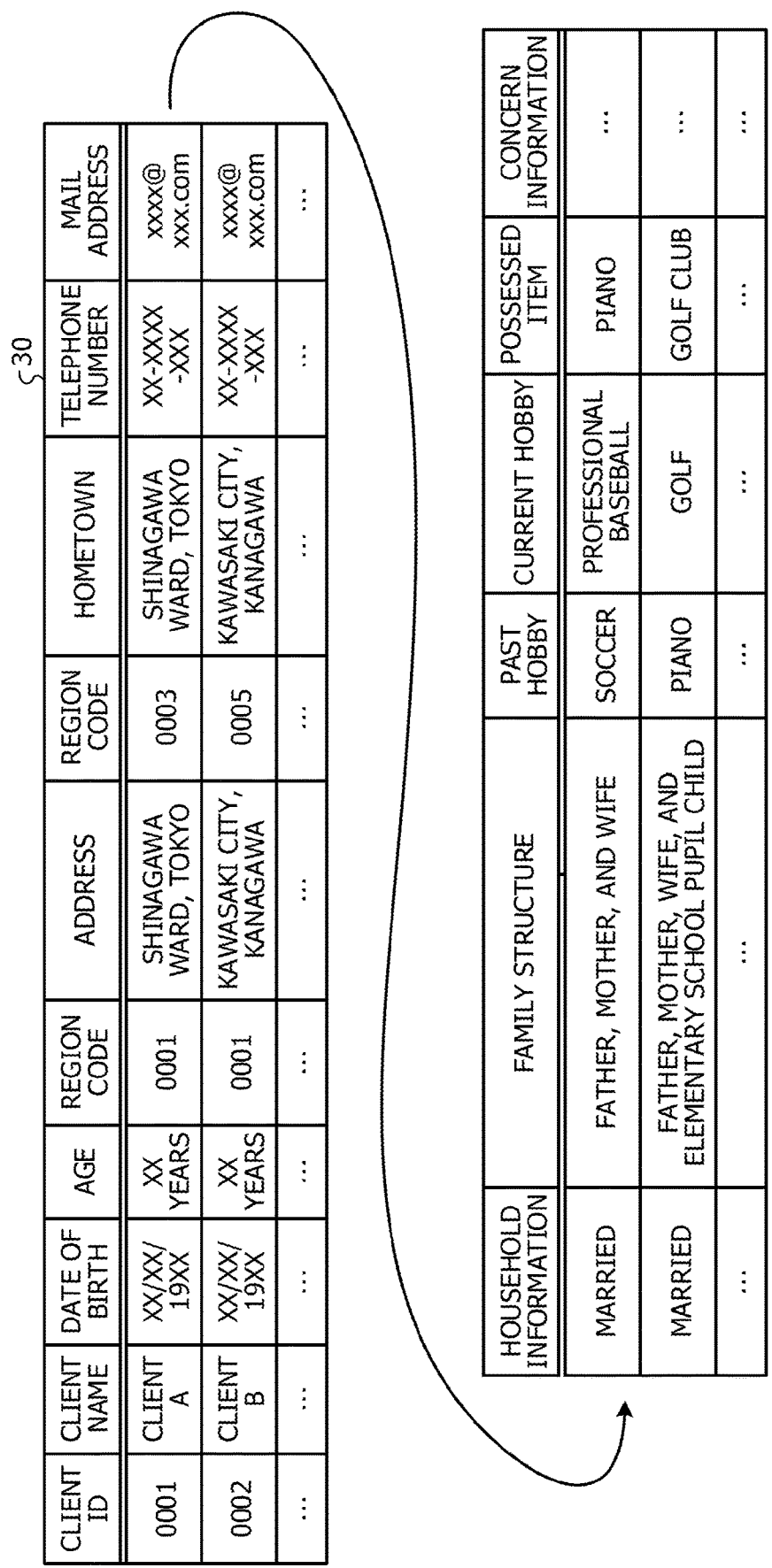
FIG. 8 illustrates an example of a data configuration of a client information DB.

Next, the client information DB 31 will be described. FIG. 8 illustrates an example of a data configuration of the client information DB 31. As illustrated in FIG. 8, the client information DB 31 includes items such as, for example, the client ID, the client name, the date of birth, the age, the region code (address), and the address. The client information DB 31 also includes items such as, for example, the region code (hometown), the hometown, the telephone number, the mail address, the household information, the family structure, the past hobby, the current hobby, the possessed item, and the concern information. The client information DB 31 stores one record for each client ID, for example. The client ID is an identifier that uniquely identifies the client. The region code (address) is an identifier that identifies the region corresponding to the address. The region code (hometown) is an identifier that identifies the region corresponding to the hometown. The household information is information for distinguishing whether the person is unmarried or married. It is noted that the respective items of the client information DB 31 illustrated in FIG. 8 are examples, and the client information DB 31 may also include other items.

Here, the concern information of the client information DB 31 will be described with reference to FIG. 9. FIG. 9 illustrates an example of a data configuration of the concern information of the client information DB. As illustrated in FIG. 9, the concern information of the client information DB includes items such as, for example, the client ID, a client word ID, the keyword, the classification, the time-series ID, the time, and the interest level. The client word ID is an identifier that uniquely identifies the interest keyword of the client. The keyword is information indicating the interest keyword of the client. The classification is information indicating the classification of the keyword. The time-series ID is an identifier that identifies the "time" such as the past, the present, and the future associated with the keywords. For example, information obtained from the time stamp of the file or the like can be used as the time-series ID. The time is information of the time indicated by the time-series ID associated with the keyword. The interest level is information indicating the interest level of the client with respect to the keyword. Information based on the client response with respect to the topic which is provided when the user has visited the client can be used as the interest level, for example. It is noted that FIG. 9 illustrates an example of a case where the concern information of a client B is stored. In addition, the respective items of the concern information illustrated in FIG. 9 are examples, and the concern information may also include other items.

Next, the similar word DB 32 will be described. FIG. 10 illustrates an example of a data configuration of the similar word DB 32. As illustrated in FIG. 10, the similar word DB 32 includes items such as, for example, a word ID, the keyword, a similar word code, a similar word, and a similarity level. The word ID is an identifier that uniquely identifies the keyword. The keyword is information indicating the keyword corresponding to the word ID. The similar word code is an identifier that identifies the similar word. The similar word is information indicating the similar word corresponding to the keyword. The similarity level is information indicating the similarity level between the corresponding keyword and the similar word. For example, a word "health" is associated with a similar word of the keyword "dieting". In addition, the keyword may be associated with a plurality of similar words. For example, a similar word of a keyword "piano" are associated with a plurality of similar words such as "music", "concert", and "musical instrument". It is noted that the respective items of the similar word DB 32 illustrated in FIG. 10 are examples, and the similar word DB 32 may also include other items.

In addition, the similar word DB 32 further includes the region information and the family structure information. Here, the region information and the family structure information will be described with reference to FIG. 11 and FIG. 12. FIG. 11 illustrates an example of a data configuration of the region information. As illustrated in FIG. 11, the region information includes items such as, for example, a region code, a region name, an area 1, and an area 2. The region code is an identifier that identifies the region. The region name is a name of the region corresponding to information indicating the region code. The area 1 is information indicating an area including the region corresponding to the region code. The area 2 is a wider area than the area 1, and information with regard to further wider areas such as an area 3, an area 4, can also be included. In addition, the areas 1 and 2 can be respectively set as common areas including a plurality of region names and the area 1. For example, the region names "Ohta Ward" and "Shinagawa Ward" are included in the area 1 "Tokyo". In addition, for example, "Tokyo" in the area 1 and "Kanagawa" in the area 1 are included in the area 2 "Kanto". It is noted that in a case where the names are common to both the area 1 and the area 2 as in the region names "Ohta Ward" and "Shinagawa Ward", "Tokyo" which is the narrower range than "Kanto"

is set as the region information. It is noted that the respective items of the region information illustrated in FIG. 11 are examples, and the region information may also include other items.

FIG. 12 illustrates an example of a data configuration of the family structure information. As illustrated in FIG. 12, the family structure information includes items such as, for example, a family code, the family member, and the keyword. The family code is an identifier that identifies the family member. The family member is information indicating the family member corresponding to the family code. The keyword is information indicating the keyword corresponding to the family member. A relationship, for example, between the family member and the keyword includes the following example. For example, "single" is associated with "work, hobby, and marriage". For example, "spouse" is associated with "birth, housing, work, and income tax". For example, "infant" is associated with "child care, birth, kindergarten, nursery, and housing". For example, "elementary school pupil" is associated with "child-raising, culture lesson, junior high school entrance examination, and housing". For example, "junior high school student" is associated with "child-raising, club activity, high school entrance examination, and culture lesson". For example, "high school student" is associated with "university entrance examination, club activity, overseas education, and English lesson". For example, "university student" is associated with "employment, overseas education, English lesson, and certification course". In addition, for example, "elderly parent" is associated with "nursing care, pension, inheritance, hospital, and nursery home". It is noted that the respective items of the family structure information illustrated in FIG. 12 are examples, and the family structure information may also include other items. In addition, the keywords corresponding to the respective family members can also be freely selected and set by the user.

In addition, the storage unit 21 may further store public keyword information. FIG. 13 illustrates an example of a data configuration of the public keyword information. As illustrated in FIG. 13, the public keyword information is a trend word at the moment or the like and includes items such as a word code that identifies the keyword, the keyword, the classification, the time-series ID, the time, and the interest level. The public keyword information stores one record for each word code, for example. It is noted that the respective items of the public keyword information illustrated in FIG. 13 are examples, and the public keyword information may also include other items.

Descriptions will be provided with reference to FIG. 5 again. The control unit 22 controls the server apparatus 12. The control unit 22 is realized, for example, when a program stored in an internal storage device is executed by a central processing unit (CPU), a micro processing unit (MPU), or the like while the RAM is used an operating area. In addition, the control unit 22 may be realized, for example, by an integrated circuit such as an application specific integrated circuit (ASIC) or a field programmable gate array (FPGA).

The control unit 22 includes an internal memory storing programs that prescribe various processing procedures and control data and executes various processings based on the programs and the control data. The control unit 22 functions as various processing units while the various programs are operated. For example, the control unit 22 includes a registration unit 50, a creation unit 51, and a display control unit 52. The registration unit 50 accepts a registration of the extracted keywords, an input of various information, and the like. The registration unit 50 stores the accepted information and the like in corresponding various databases and various files of the storage unit 21. The creation unit 51 obtains data from the various DBs, data files, and the like and creates a data file screen data, and the like used for the processing based on the various data. The display control unit 52 controls display of the various information.

When the registration unit 50 accepts an access from the user terminal 11, the registration unit 50 outputs an instruction for the display control unit 52 to transmit information of various operation screens to the user terminal 11 at the access source and cause the user terminal 11 at the access source to display the operation screens. The registration unit 50 accepts an input of the user ID on a login screen displayed on the user terminal 11 and accepts login of the user. When the registration unit 50 accepts the login, the registration unit 50 outputs an instruction for the display control unit 52 to display a selection screen of the client, for example.

Hereinafter, for example, the respective function units will be described while a case where the "user A" having the user ID "0001" logs in, and the "client B" having the client ID "0002" is selected on the selection screen of the client is set as an example.

The registration unit 50 accepts the registration of the plurality of words respectively associated with the times to be stored in the operating area of the storage unit 21 as the first word group and accepts the registration of the plurality of words respectively associated with the times to be stored in the storage unit 21 as the second word group. For example, the registration unit 50 reads out a registered word group (first word group) of the "user A" from the user information DB 30 to be stored in the operating area of the storage unit 21 and reads out a registered word group (second word group) of the "client B" from the client information DB 31 to be stored in the operating area of the storage unit 21.

The creation unit 51 creates respective word information files of the user and the client based on the word group registered by the registration unit 50. Here, the word information file of the user will be described with reference to FIG. 14. FIG. 14 illustrates an example of a data configuration of the word information file of the user A. As illustrated in FIG. 14, the word information file of the user A stores information with regard to the registered word group of the user. Specifically, the word information file of the user A includes items such as, for example, the user ID, the user word ID, the registered word of the user, and the time-series ID. The user ID is an identifier that uniquely identifies the user. It is noted that the user ID is the user ID of the user A herein. The user word ID is an identifier that uniquely identifies the registered word of the user. The registered word of the user is information indicating the word included in the registered word group of the user. The time-series ID is information for identifying "time" such as the past, the present, and the future associated with the registered word of the user. It is noted that the respective items of the word information file of the user A illustrated in FIG. 14 are examples, and the word information file of the user A may also include other items.

Next, the word information file of the client will be described with reference to FIG. 15. FIG. 15 illustrates an example of a data configuration of the word information file of the client B. As illustrated in FIG. 15, the word information file of the client B stores information with regard to the registered word group of the client. Specifically, the word information file of the client B includes items such as, for example, the client ID, the client word ID, the registered word of the client, and the time-series ID. The client ID is an identifier that uniquely identifies the client. It is noted that the client ID is the client ID of the client B herein. The client word ID is an identifier that uniquely identifies the registered word of the client. The registered word of the client is information indicating the word included in the registered word group of the client. The time-series ID is information for identifying "time" such as the past, the present, and the future associated with the registered word of the client. It is noted that the respective items of the word information file of the client B illustrated in FIG. 15 are examples, and the word information file of the client B may also include other items.

Descriptions of the creation unit 51 will be provided again. The creation unit 51 creates screen data for displaying the third word group corresponding to the time specified in the first word group stored in the storage unit 21 and also the fourth word group corresponding to the time specified in the second word group. For example, the creation unit 51 creates screen data for displaying respective interest transitions in the time-series manner in accordance with the past, the present, and the future based on the registered word group of the user A and the registered word group of the client B. The creation unit 51 respectively selects the words corresponding to the specified time as the display word group of the user A (third word group) and the display word group of the client B (fourth word group) among the registered word group of the user A and the registered word group of the client B. The creation unit 51 then creates screen data for displaying the respective display word groups in the time-series manner as the interest transitions of the user A and the client B.

Figure 16:
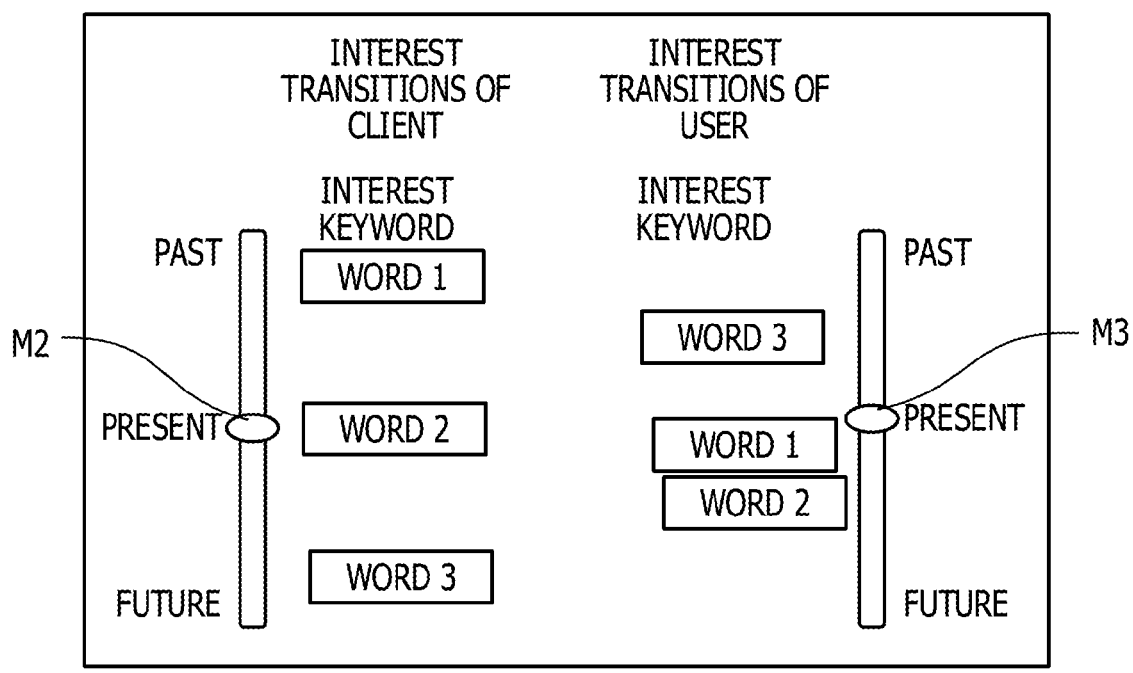
FIG. 16 illustrates an example of time-series display of interest keywords of the user and the client.

With regard to a reference for the selections of the display word groups, the creation unit 51 selects, for example, an amount of words that can be displayed in the display area while the present is set as the center among the user registered word group and the registered word group of the client as the respective display word groups. FIG. 16 illustrates an example of time-series display of interest keywords of the user and the client. As illustrated in FIG. 16, for example, the creation unit 51 performs the creation by associating a word 1 with the past, a word 2 with the present, and a word 3 with the future as the interest transitions of the client and associating the word 3 with the past, the word 1 with the present, and the word 2 with the present as the interest transitions of the user. It is noted that slide bars M2 and M3 are configured to accept a specification of the time by the user.

In addition, the creation unit 51 refers to the similar word DB 32 and extracts the common keywords with regard to the hobby, the region, the family, the possessed item, and the like from the respective registered word groups of the user A and the client B. At this time, the creation unit 51 may create a common word information file including information with regard to the common keyword based on the registered word group of the user and the registered word group of the client.

FIG. 17 illustrates an example of a data configuration of the common word information file. As illustrated in FIG. 17, the common word information file includes items such as, for example, the client ID, the client word ID, the registered word of the client, the user ID, the user word ID, and the registered word of the user as the information with regard to the keyword common to the user A and the client B. It is noted that the respective items of the common word information file illustrated in FIG. 17 are examples, and the common word information file may also include other items.

For example, the common word information file may also include information such as the time-series ID and the classification associated with the respective registered words.

Figure 18:
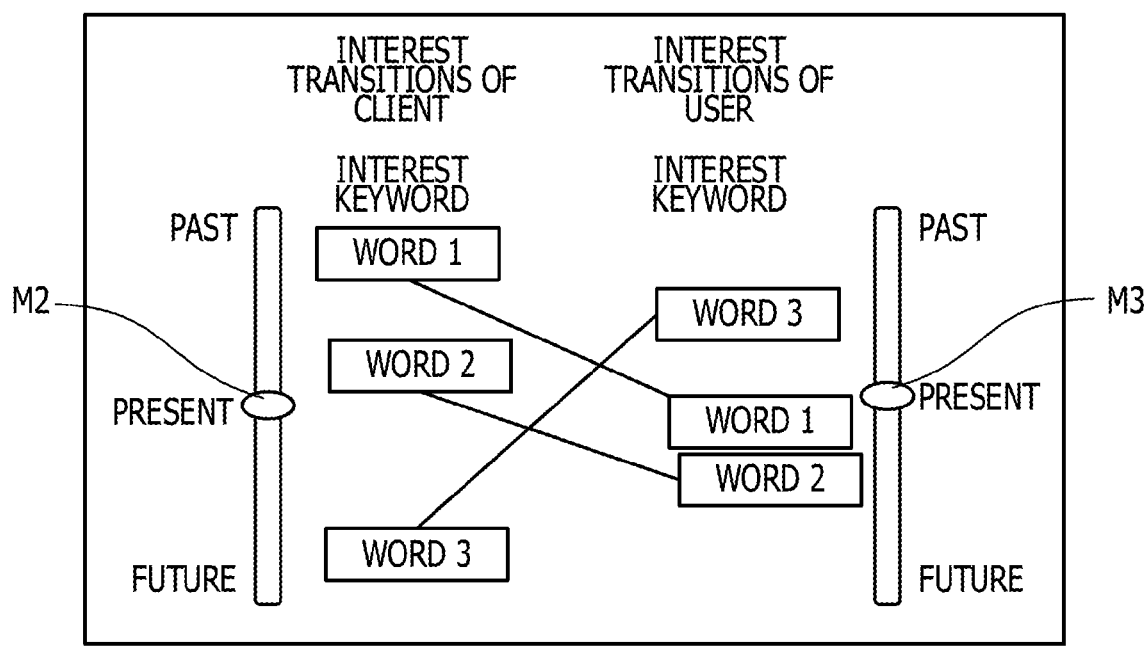
FIG. 18 illustrates an example of time-series display in a case where common interest keywords are displayed by connecting lines.

In a case where the same word as a particular word included in the display word group of the user or the client is included in the registered word group of the user or the client, the creation unit 51 can add the direction of the common word in which the particular word is set as the reference to the screen data. The direction of the common word is displayed, for example, by the connecting line that connects the words to each other. That is, the creation unit 51 can add the connecting line that connects the common keyword (registered word) to each other to the screen data for displaying the respective interest transitions of the user and the client in the time-series manner. FIG. 18 illustrates an example of time-series display in a case where common interest keywords are displayed by connecting lines. As illustrated in FIG. 18, for example, the creation unit 51 adds the connecting line that connects the word 1 (past) of the client and the word 1 (present) of the user to each other and the connecting line that connects the word 2 (present) of the client and the word 2 (present) of the user to each other to the screen data. It is noted that the slide bars M2 and M3 are also displayed in the screen data of FIG. 18 similarly as in FIG. 16.

The creation unit 51 can also select both the particular word and the common word from among words having a set weighting that satisfies a predetermined condition. According to the predetermined condition, for example, in a case where the weighting is set in 10 stages, it is possible to select only the words having the weighting higher than or equal to 5. As a result, it is possible to represent the keywords most interested in by the user and the client in such a manner that the user can easily understand.

In addition, the creation unit 51 can change the display mode for the respective words regard to the screen data for displaying the respective interest transitions in the time-series manner into a display mode in accordance with the set weightings. For example, the creation unit 51 performs the update such that each of the words is set to have the character size in accordance with the interest level. At this time, the creation unit 51 can create the screen data by selecting the character sizes (font sizes) in accordance with the heights of the interest levels with respect to the respective words.

The creation unit 51 can add a fifth word group including a single or a plurality of words respectively associated with the times to the screen data. The fifth word group is, for example, the public keyword and the like. The creation unit 51 reads out the public keywords respectively associated with the times from the public keyword information to be stored in the operating area of the storage unit 21 as a public registered word group, for example. The creation unit 51 then adds the keyword to be displayed in the public registered word group to the screen data as a display word group (fifth word group).

At this time, the creation unit 51 can create a public word information file based on the public registered word group. FIG. 19 illustrates an example of a data configuration of the public word information file. As illustrated in FIG. 19, the public word information file includes items such as, for example, a public word ID, a public registered keyword, and the time-series ID. The public word ID is an identifier that uniquely identifies the public registered word. It is noted that the respective items of the public word information file illustrated in FIG. 19 are examples, and the public word information file may also include other items.

Figure 20:
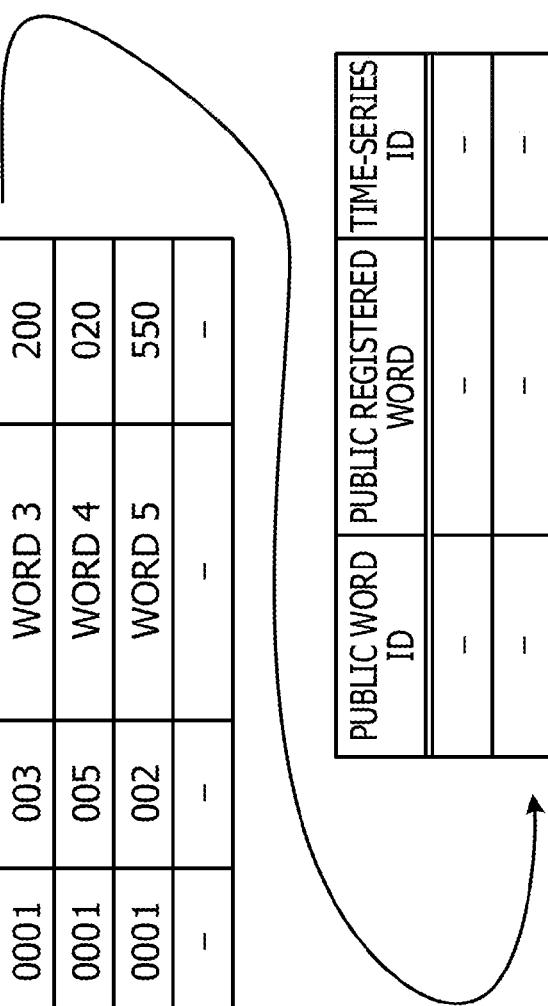
FIG. 20 illustrates an example of a data configuration of the common word information file.

The creation unit 51 may also create the common word information file based on the registered word group of the user, the registered word group of the client, and the public registered word group. FIG. 20 illustrates an example of a data configuration of the common word information file. As illustrated in FIG. 20, the common word information file includes items such as, for example, the client ID, the client word ID, the registered word of the client, the time-series ID (client), the user ID, the user word ID, the registered word of the user, and the time-series ID (user). Furthermore, the common word information file includes items such as a public word ID, the public registered keyword, and the time-series ID (public). The time-series ID (client) is a time-series ID corresponding to the registered word of the client. The time-series ID (user) is a time-series ID corresponding to the registered word of the user. The time-series ID (public) is a time-series ID corresponding to the public registered word. It is noted that the respective items of the common word information file illustrated in FIG. 20 are examples, and the common word information file may also include other items.

Figure 21:
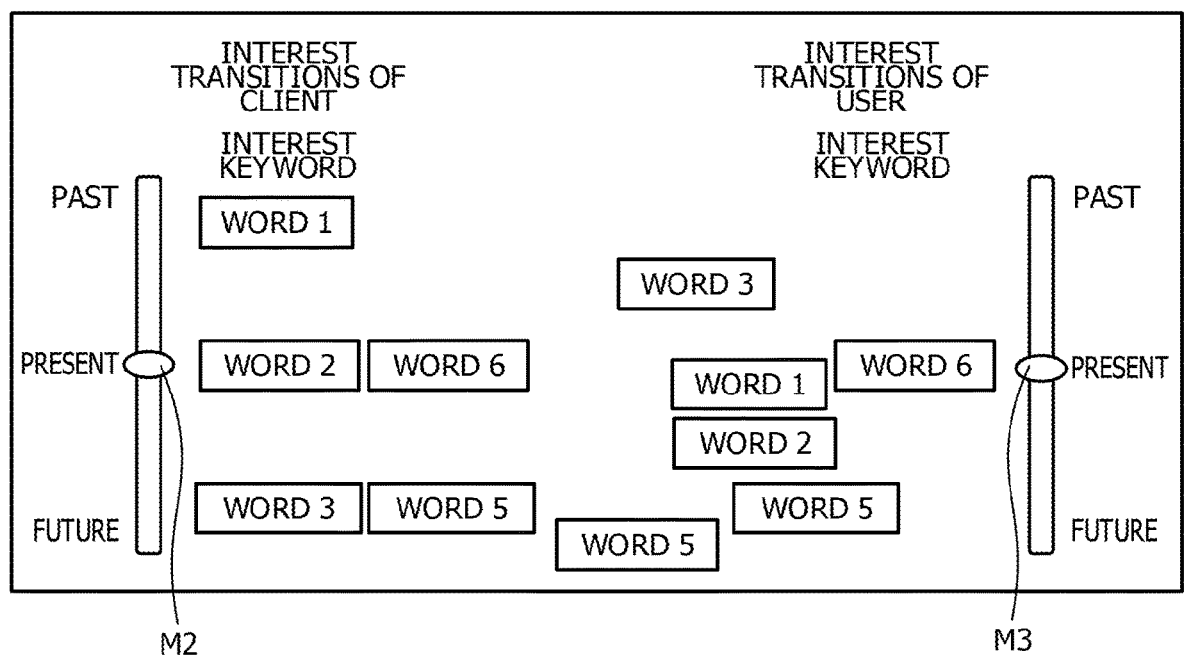
FIG. 21 illustrates an example of time-series display in a case where a public keyword is added.

FIG. 21 illustrates an example of time-series display in a case where the public keyword is added. As illustrated in FIG. 21, the creation unit 51 adds a public display word group to the display area of each of the user and the client in the screen data of the time-series display of the interest keywords of the user and the client illustrated in FIG. 16. For example, the creation unit 51 adds a word 5 to the position corresponding to the future and a word 6 to the position corresponding to the present.

Figure 22:
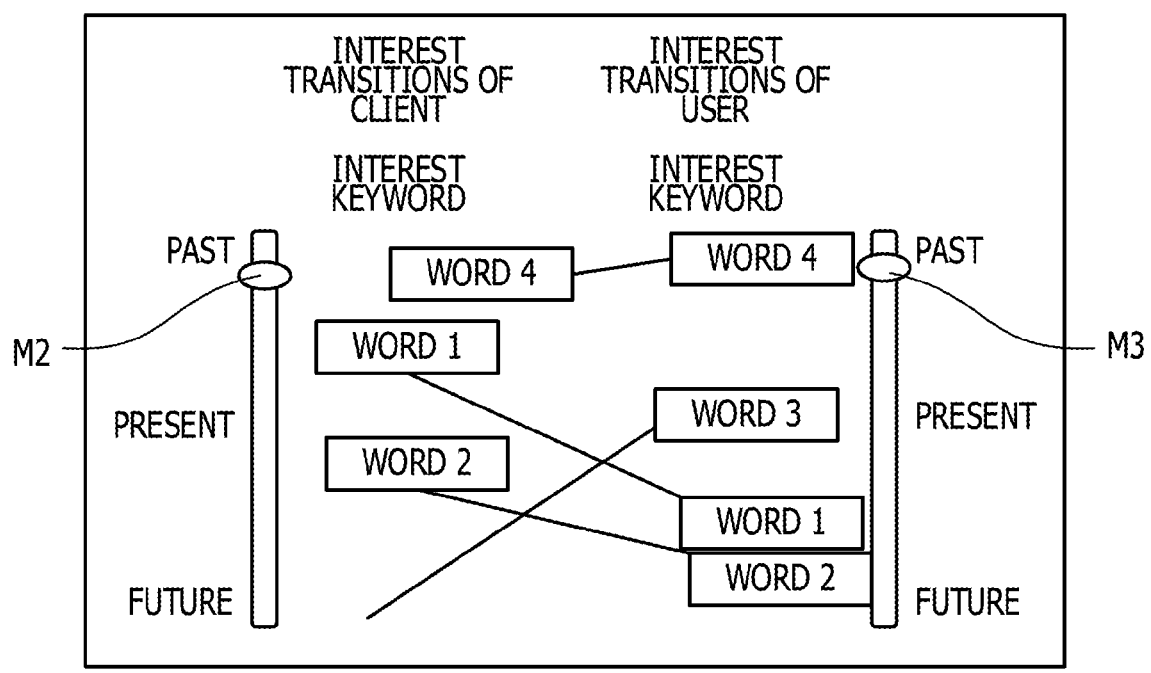
FIG. 22 illustrates an example of time-series display in a case where a slide bar is moved to "past"

In addition, when the registration unit 50 accepts movements of the slide bars M2 and M3 indicating the times by the user, the creation unit 51 can create the screen data for displaying the interest keyword in accordance with positions of the slide bars M2 and M3. FIG. 22 illustrates an example of time-series display in a case where the slide bars are moved to the past. As illustrated in FIG. 22, the creation unit 51 can move the display word group displayed in the display area while the present is set in the center in accordance with the positions of the slide bars M2 and M3 indicating the times. For example, when the registration unit 50 accepts the movements of the slide bars M2 and M3 by the user, the creation unit 51 creates the screen data by sequentially selecting the display word group of the user and the display word group of the client to be displayed so as to correspond to the times in accordance with the positions of the slide bars M2 and M3.

At this time, the slide bars M2 and M3 may be independently moved. For example, in a case where the position of the slide bar M2 indicates the present and the position of the slide bar M3 indicates the past, the creation unit 51 creates the screen data in which the display word group associated with the present is displayed with regard to the interest transitions of the client, and the display word group associated with the past is displayed with regard to the interest transition of the user. It is noted that a configuration may be adopted in which words leaving the display area by the movement are not displayed. In addition, in a case where the connecting line that connects the mutual keywords is displayed, the connecting line leaving the display area by the movement may be cut.

When the registration unit 50 accepts the selection of the keyword by the user, the creation unit 51 can create the screen data for displaying information of an era based on the selected keyword.

The display control unit 52 causes the user terminal 11 to display the various screens such as the operation screen. For example, the display control unit 52 causes the user terminal 11 to display the profile information of the client dealt with by the user having the input user ID.

The display control unit 52 displays the third word group corresponding to the time specified in the first word group stored in the storage unit 21 and also displays the fourth word group corresponding to the time specified in the second word group. For example, the display control unit 52 outputs the thus created screen data to the user terminal 11 to be displayed on the screen of the user terminal 11. For example, the display control unit 52 outputs the screen data for respectively displaying the words corresponding to the specified time among the registered word group of the user A and the registered word group of the client B as the display word group of the user A (third word group) and the display word group of the client B (fourth word group) on a client profile information display screen to the user terminal 11.

Figure 23:
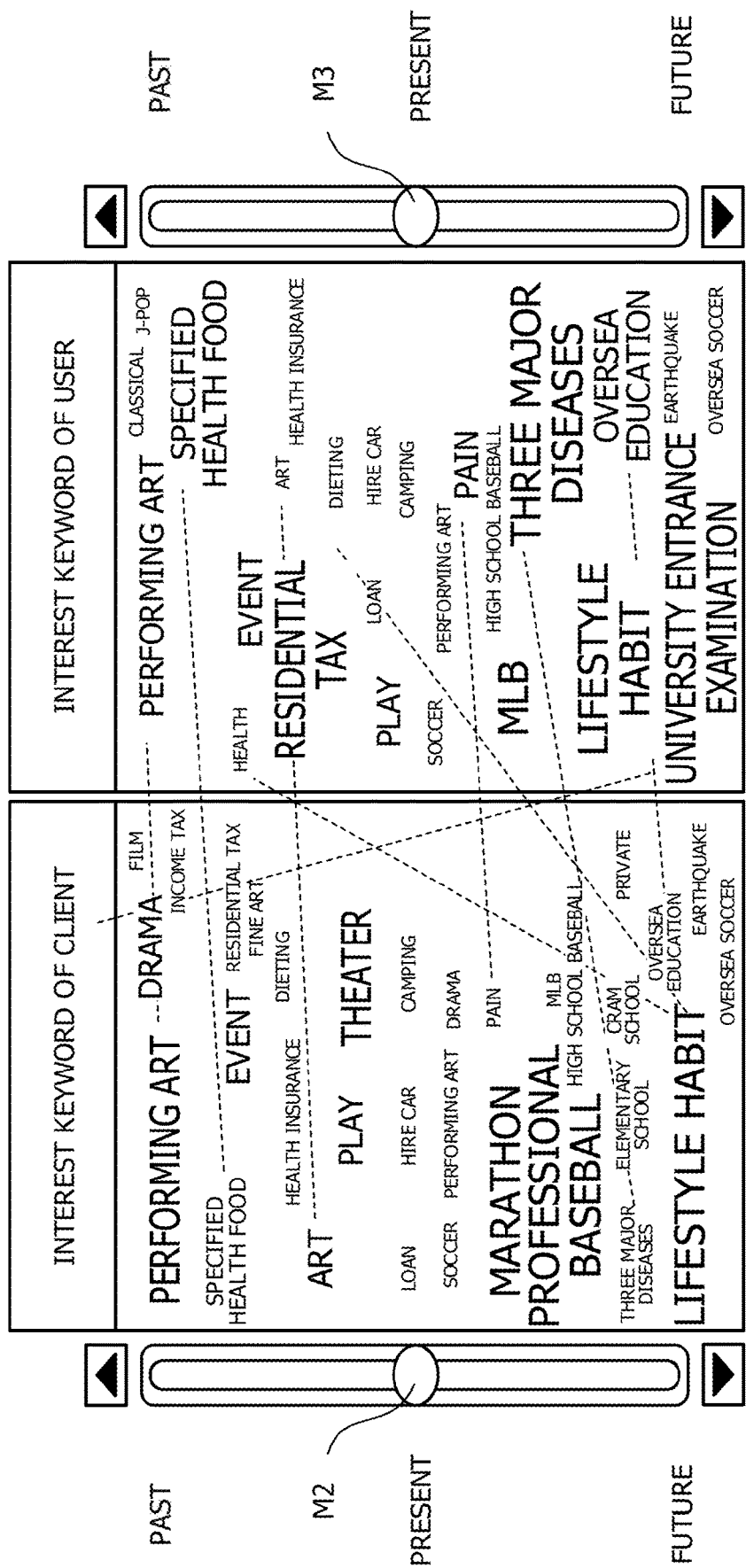
FIG. 23 illustrates an example of a client profile information display screen.

FIG. 23 illustrates an example of the client profile information display screen. As illustrated in FIG. 23, the display control unit 52 outputs the screen data (for example, FIG. 16) to the user terminal 11 to be displayed on the client profile information display screen as the display word group of the user A and the display word group of the client B.

The display control unit 52 can also display the interest keywords common to the client and the user by the connecting line. For example, the display control unit 52 can output the screen data (for example, FIG. 18) to the user terminal 11 and display the connecting line that connects the mutual interest keywords common to the user and the client on the client profile information display screen of FIG. 23.

In addition, the display control unit 52 can output the changed screen data to the user terminal 11 and change the display mode for the respective words into the display mode in accordance with the set weightings. For example, the display control unit 52 can perform the display in the character sizes (font sizes) in accordance with the heights of the interest levels with respect to the respective words on the client profile information display screen of FIG. 23.

The display control unit 52 can also add and display the public keyword. For example, the display control unit 52 outputs the screen data (for example, FIG. 21) to the user terminal 11 and displays the public display word group in the display area of the client profile information display screen of FIG. 23 in the time-series manner.

In addition, the slide bars M2 and M3 are displayed on the left and right of the display area on the client profile information display screen of FIG. 23. The display control unit 52 can output the screen data (for example, FIG. 22) to the user terminal 11 in accordance with the movements of the slide bars M2 and M3 by the user and display the interest keywords of the past, the present, and the future in accordance with the positions of the slide bars M2 and M3.

At this time, the slide bars M2 and M3 may be independently moved. For example, in a case where the position of the slide bar M2 indicates the present and the position of the slide bar M3 indicates the past, the display control unit 52 displays the display word group associated with the present with regard to the interest transitions of the client and the display word group associated with the past with regard to the interest transition of the user. It is noted that a configuration may be adopted in which the words leaving the display area by the movement are not displayed. In addition, in a case where the connecting line that connects the mutual keywords is displayed, the connecting line leaving the display area by the movement may be cut.

When the registration unit 50 accepts the selection of the keyword by the user, the display control unit 52 can display the information of the era based on the selected keyword.

It is noted that other information can also be displayed on the client profile information display screen of FIG. 23. For example, interests with regard to life events of the client may also be digitalized and displayed in conjunction with the interest keywords. The life events specifically include, for example, the marriage, the birth, the child care, the housing, the university, the nursing care, and the like.

In addition, the screen for providing the topic in which the concern of the client is predicted to be high can be displayed from the client profile information display screen of FIG. 23 based on the respective interest keywords displayed in the time-series manner as described above, for example, as illustrated in FIG. 3. The topic associated with the interest keyword of the user, the topic associated with the interest keyword of the client, and the topic associated with the interest keyword common to the user and the client can be displayed on the topic provision screen illustrated in FIG. 3. As a result, it is possible to provide the topic associated with the common point with respect to the client to the client by checking the mutual interest or the common point when the user visits the client.

Processing Flow

Figure 24:
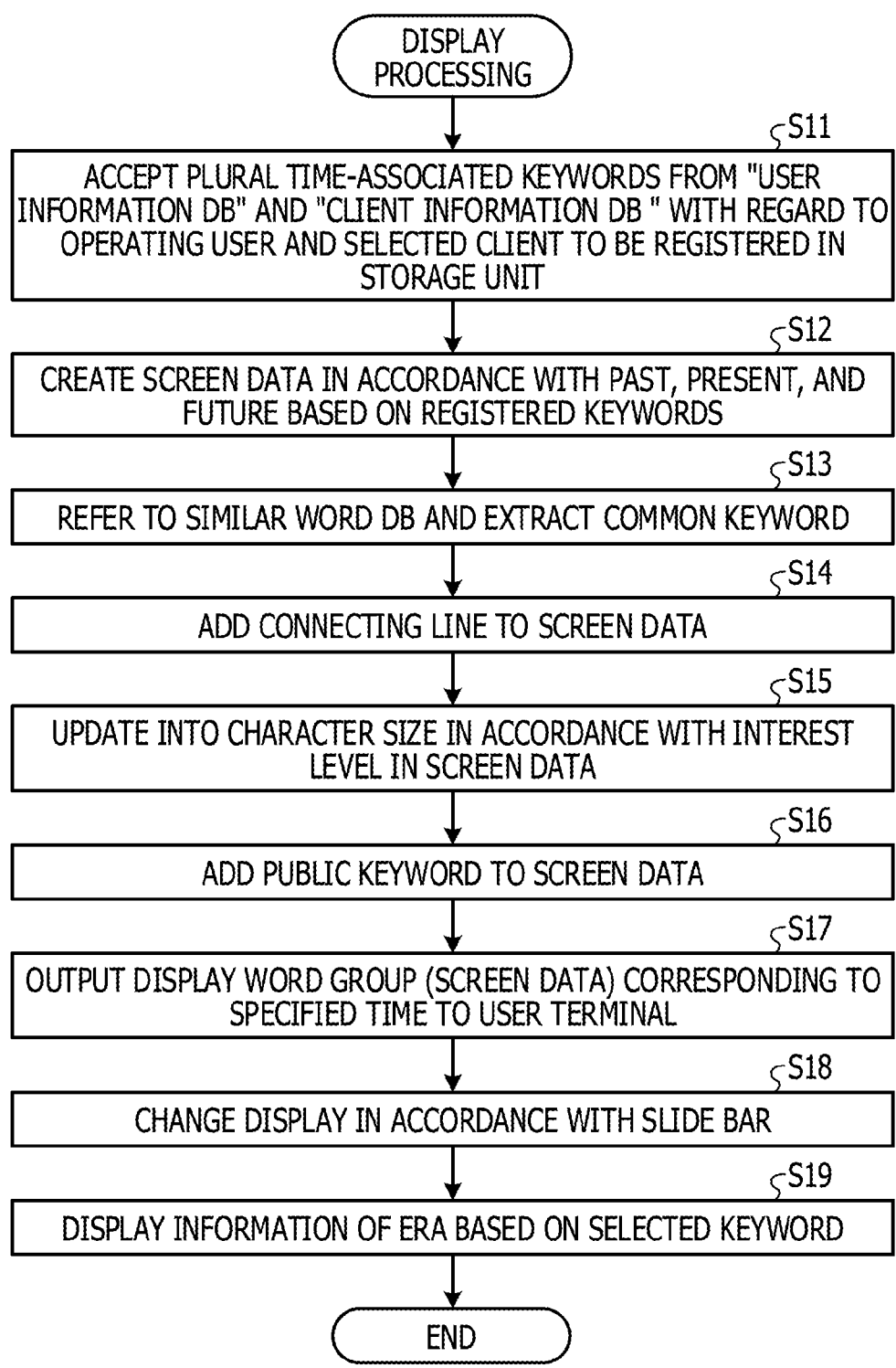
FIG. 24 is a flow chart illustrating an example of display processing according to the first exemplary embodiment.

Next, an operation of the server apparatus 12 according to the present exemplary embodiment will be described. FIG. 24 is a flow chart illustrating an example of display processing according to the first exemplary embodiment. Processing starts when the logged-in user selects a particular client in the display processing. Herein, for example, the "user A" having the user ID "0001" logs in and operates to select the "client B" having the client ID "0002" will be described.

First, the registration unit 50 accepts a plurality of (time-associated) keywords associated with the times from the user information DB 30 and the client information DB 31 with regard to the operating user A and the selected client B. The registration unit 50 respectively registers the plurality of accepted keywords as the registered word group of the user A and the registered word group of the client B in the storage unit 21 (step S11). At this time, the creation unit 51 can create the word information file of the user A illustrated in FIG. 14 and the word information file of the client B illustrated in FIG. 15, and the like based on the respective registered word groups.

Next, the creation unit 51 creates the screen data for displaying the respective interest transitions in the time-series manner in accordance with the past, the present, and the future based on the registered word group of the user A and the registered word group of the client B as illustrated in FIG. 16 (step S12).

Subsequently, the creation unit 51 refers to the similar word DB 32 and extracts the common keywords with regard to the hobby, the region, the family, the possessed item and the like from the respective registered word groups of the user A and the client B (step S13). At this time, the creation unit 51 can create, for example, the common word information file illustrated in FIG. 17 based on the respective registered word groups.

As illustrated in FIG. 18, the creation unit 51 adds the connecting line that connects the mutual common keywords to the screen data for displaying the respective interest transitions in the time-series manner (step S14).

The creation unit 51 updates the character size in accordance with the interest level in the screen data for displaying the respective interest transitions in the time-series manner with regard to each of the keywords (step S15).

The creation unit 51 refers to the public keyword information illustrated in FIG. 13, and extracts the plurality of keywords respectively associated with the times and accepts a registration to be stored in the storage unit 21 as the public registered word group. The creation unit 51 adds the public registered word group to the screen data (step S16). At this time, the creation unit 51 can create the public word information file illustrated in FIG. 19 based on the public registered word group. It is noted that the processing in step S16 is omitted in a case where the public keyword is not additionally displayed.

The display control unit 52 outputs the screen data (for example, FIG. 16) for displaying the display word group associated with the time to the user terminal 11 with regard to the interest transitions of the user A and the client B (step S17). The display control unit 52 subsequently respectively displays the keywords associated with the specified time among the registered word group of the user A and the registered word group of the client B as the display word group of the user A (third word group) and the display word group of the client B (fourth word group). In a case where the public keyword is additionally displayed, the display control unit 52 adds and displays the keyword corresponding to the specified time in the public registered word group as the public display word group (fifth word group). The public display word group is added, for example, to both the display word group of the user A and the display word group of the client B and displayed.

Herein, when the registration unit 50 accepts the movements of the slide bars M2 and M3 by the user, the display control unit 52 outputs the corresponding screen data (for example, FIG. 22) to the user terminal 11. The display control unit 52 then changes the display of the display word group of the user and the display keyword group of the client so as to corresponding to the times indicated by the positions of the slide bars M2 and M3 (step S18). In a case where the public keyword is additionally displayed, the display of the display word group of the user, the display keyword group of the client, and the public display word group is changed. As a result, the keyword associated with the time can be displayed to visualize the common point.

Furthermore, when the registration unit 50 accepts the selection of the keyword by the user, the display control unit 52 outputs the corresponding screen data to the user terminal 11 to display the information of the era based on the selected keyword (step S19), and the processing is ended.

It is also possible to display the topic predicted to have the high concern of the client on the screen based on the respective interest keywords displayed in the time-series manner as described above, for example, as illustrated in FIG. 3. The topic associated with the interest keyword of the user, the topic associated with the interest keyword of the client, and the topic associated with the interest keyword common to the user and the client can be displayed on the topic provision screen illustrated in FIG. 3. As a result, it is possible provide the topic associated with the common point with respect to the client to the client by checking the mutual interest or the common point when the user visits the client.

Advantages

As described above, the server apparatus 12 accepts the registration of the plurality of words respectively associated with the times to be stored in the storage unit 21 as the first word group and accepts the registration of the plurality of words respectively associated with the times to be stored in the storage unit 21 as the second word group. In addition, the server apparatus 12 can display the third word group corresponding to the time specified in the first word group stored in the storage unit 21 and also display the fourth word group corresponding to the time specified in the second word group. As a result, the server apparatus 12 can support the provision of the appropriate topic.

In a case where the weighting setting is performed with regard to the respective words registered as the first word group and the second word group, the display mode for the words included in the third word group and the words included in the fourth word group can be displayed in the display mode in accordance with the set weightings in the server apparatus 12. As a result, the server apparatus 12 can visualize the weightings with respect to the respective words.

In a case where the same word as the particular word included in the third word group or the fourth word group is included in the second word group or the first word group, the server apparatus 12 can display the direction of the common word in which the particular word is set as the reference. As a result, the server apparatus 12 can visualize and display the common word in a manner that the user easily understands.

The server apparatus 12 can also display the direction of the common word by the connecting line that connects the words to each other. As a result, the server apparatus 12 can visualize and display the common word in a manner that the user further easily understands.

In addition, in a case where the weighting setting is performed with regard to the respective words registered as the first word group and the second word group, both the particular word and the common word can be selected from the words having the set weighting that satisfies the predetermined condition and displayed in the server apparatus 12. As a result, the server apparatus 12 can visualize and display the common word in a manner that the user easily understands.

The server apparatus 12 can also additionally display the fifth word group including the single or plurality of words respectively associated with the times. As a result, the server apparatus 12 can visualize the common point while the keyword associated with the time is also compared with public information or the like.

In addition, the server apparatus 12 can set the weighting in accordance with the height of the interest level of the first user or the second user as the weighting. As a result, the server apparatus 12 can visualize the interest levels with respect to the respective words.

The server apparatus 12 can also display the respective words in the sizes in accordance with the weighting settings as the display mode. As a result, the server apparatus 12 can visualize the weightings with respect to the respective words in a manner that the user easily understands.

The respective components of the respective units illustrated in the drawings may have configurations other than the physical configurations illustrated in the drawings. That is, specific modes of distributions and integrations of the respective units are not limited to the modes illustrated in the drawings, and all or part of the components can be constituted by distributions and integrations in a functionally or physically manner in arbitrary units in accordance with various loads, use statuses, and the like. For example, the registration unit 50 and the creation unit 51 may be integrated to each other. In addition, orders of the respective processings illustrated in the drawings are not limited to the above-mentioned orders, and the processings may be executed at the time or may also be executed while the orders are swapped within a range without creating contradictions in processing contents.

Furthermore, all or arbitrary part of the various processing functions executed in the respective apparatuses may be executed on the CPU (or a microcomputer such as the MPU or a micro controller unit (MCU)). In addition, all or arbitrary part of the various processing functions may, of course, be executed on a program analyzed and executed on the CPU (or the microcomputer such as the MPU or the MCU) or hardware based on a wired logic.

Second Exemplary Embodiment

The exemplary embodiment related to the disclosed apparatus has been described thus far, but the disclosed technology may also be executed in various different modes other than the above-mentioned exemplary embodiment. In view of the above, another exemplary embodiment included in the present disclosure will be described below.

According to the above-mentioned first exemplary embodiment, the example has been described in which the information with regard to the past, the present, and the future are associated with the information of the times. However, the configuration is not limited to this. For example, information with regard to a date itself, an age, an age group (such as teens or twenties), and an attribution (such as a student, a working person, or a single) may be associated with the information of the times. As a result, a width of the selections by the user is expanded, and the provision of the appropriate topic can be further supported.

In addition, according to the above-mentioned first exemplary embodiment, the example has been described in which the respective keywords are displayed in the character sizes in accordance with the set weightings as the display mode. However, the configuration is not limited to this. For example, the respective words can be displayed in color concentration differences or color types in accordance with the weighting settings. As a result, the amount of keywords accommodated in the display area is uniformed, and the height of the interest level with respect to each keyword can be reflected.

Moreover, according to the above-mentioned first exemplary embodiment, the example has been described in which the display is performed in the display mode in accordance with the set weightings. However, the configuration is not limited to this. For example, the respective words can be classified into predetermined categories other than the weightings and displayed in different colors. The categories include, for example, the hobby, a public trend, or the like. As a result, the user can recognize whether the keyword is a keyword related to the hobby, the public trend, or the like.

In this manner, the server apparatus 12 can classify the respective words into the predetermined categories and display the respective words in the different colors as the display mode. As a result, the server apparatus 12 can visualize the categories to which the respective words belong in a manner that the user easily understands.

In addition, according to the above-mentioned first exemplary embodiment, the example has been described in which the keyword extracted from the public keyword information is added and displayed. However, the configuration is not limited to this. For example, a keyword extracted from news or trend keywords can also be added and displayed as the public keyword. The trend keyword may be extracted, for example, from information service such as social networking service (SNS) like Twitter (registered trademark) or blogs. As a result, the keyword reflecting the public trend and the interest transitions of the user and the client can be compared with each other.

Figure 25:
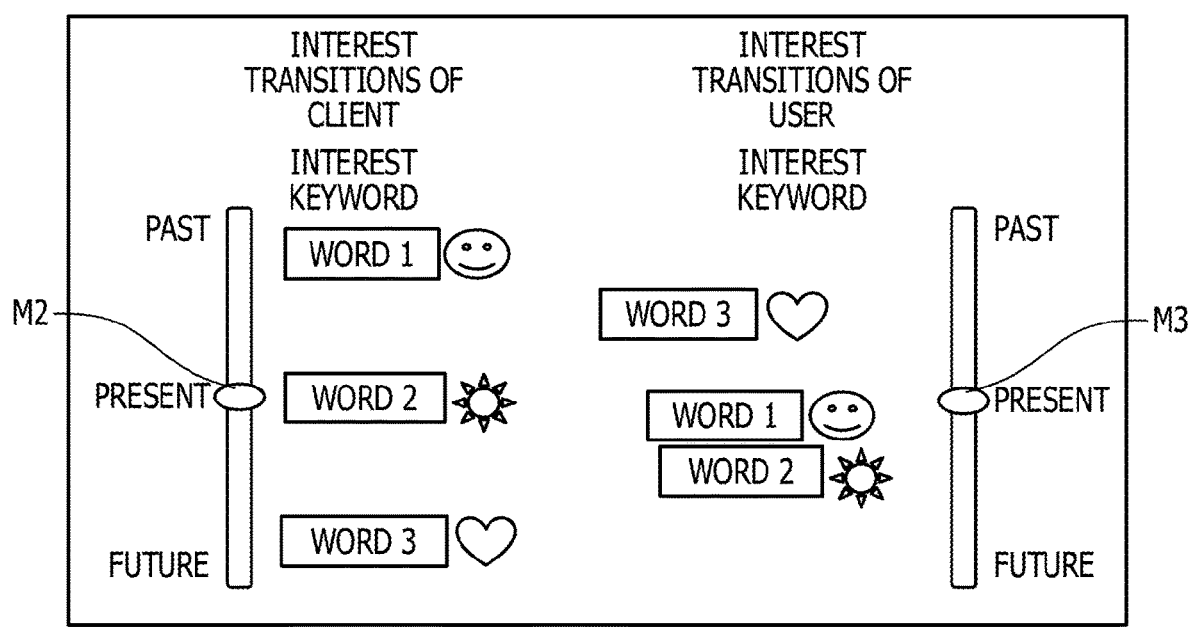
FIG. 25 illustrates an example of time-series display in a case where images are displayed together with the interest keywords.

Moreover, according to the above-mentioned first exemplary embodiment, the example has been described in which the interest keywords are displayed in the time-series manner. However, the configuration is not limited to this. For example, an associated image can also be displayed together with the interest keyword. FIG. 25 illustrates an example of time-series display in a case where the image is displayed together with the interest keyword. As illustrated in FIG. 25, images associated with the respective keywords can be displayed in the vicinity on the left, right, top, and bottom of the respective keywords. As a result, the interest keyword can be displayed in a manner that the user visually more easily understands.

Figure 26:
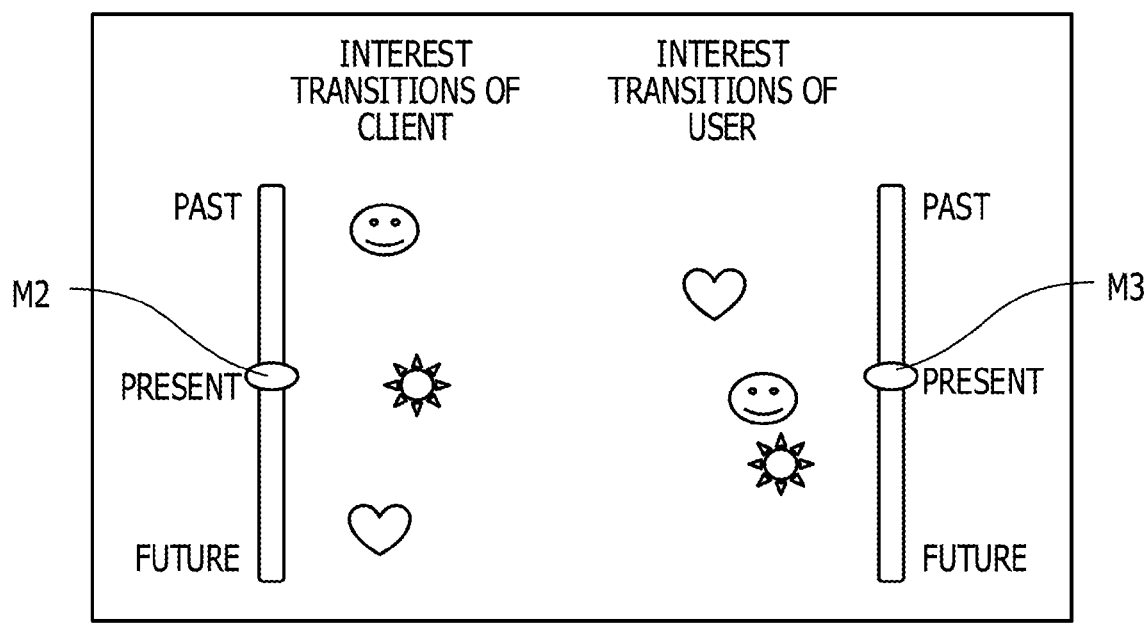
FIG. 26 illustrates an example of time-series display in a case where the image are displayed instead of the interest keywords.

For example, the associated image can also be displayed instead of the interest keyword. FIG. 26 illustrates an example of time-series display in a case where the image is displayed instead of the interest keyword. As illustrated in FIG. 26, images associated with the respective keywords can be displayed instead of the respective keywords. As a result, the interest keyword can be displayed for the user to visually easily understand the interest keyword and also be efficiently displayed in the display area.

Display Program

Figure 27:
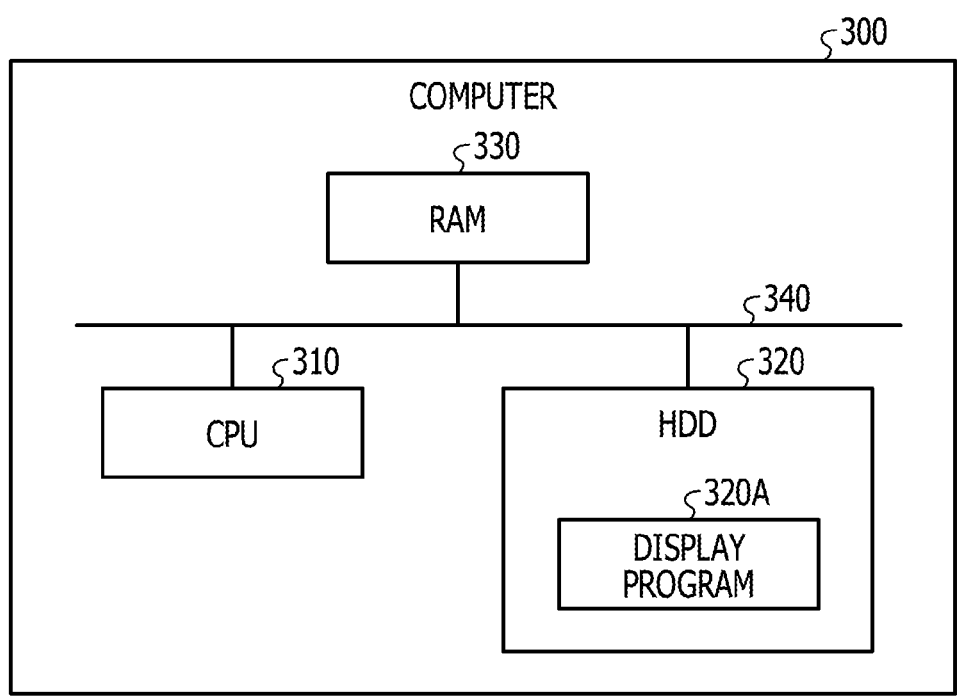
FIG. 27 illustrates an example of a computer that executes a display program.

The various processings described according to the above-mentioned respective exemplary embodiments can also be realized while a previously prepared program is executed by a personal computer or a computer system such as a work station. In view of the above, an example of the computer system that executes a program having functions similar to the above-mentioned respective exemplary embodiments. FIG. 27 illustrates an example of a computer that executes a display program.

As illustrated in FIG. 27, a computer 300 includes a CPU 310, an HDD 320, and a RAM 330. These respective units 310, 320, and 330 are connected to one another via a bus 340.

The HDD 320 previously stores display programs 320A that realizes functions similar to the respective processing units of the server apparatus 12 according to the above-mentioned respective exemplary embodiments. For example, the display programs 320A that realize functions similar to the registration unit 50, the creation unit 51, and the display control unit 52 according to the above-mentioned exemplary embodiment are stored. It is noted that the display programs 320A may be appropriately separated.

In addition, the HDD 320 stores various data. For example, the HDD 320 stores an operating system (OS) and various data.

The CPU 310 then reads out the display programs 320A from the HDD 320 to be executed, so that operations similar to those of the registration unit 50, the creation unit 51, and the display control unit 52 according to the exemplary embodiments are executed. That is, the display programs 320A execute the operations similar to the registration unit 50, the creation unit 51, and the display control unit 52 according to the exemplary embodiments.

It is noted that a configuration may be adopted in which the above-mentioned display programs 320A are not stored in the HDD 320 from the beginning. For example, a portable physical medium such as a flexible disk (FD), a compact disk read only memory (CD-ROM), a digital versatile disk (DVD), an opto-magnetic disk, or an IC card to be inserted into the computer 300 stores the programs. Then, the computer 300 may read out the programs from these media to be executed.

Furthermore, the programs are stored in "another computer (or server)" or the like connected to the computer 300 via the public line, internet, LAN, WAN, or the like. Then, the computer 300 may read out the programs from these to be executed.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A non-transitory computer-readable storage medium for storing a program, the program causing a processor to execute a process, the process comprising:
    executing a first processing that includes
        obtaining a first word group with respect to a first person, the first word group including one or more of words each of which is associated with any of a plurality of time points, and
        storing the obtained first word group in a memory;
    executing a second processing that includes
        obtaining a second word group with respect to a second person, the second word group including one or more of words each of which is associated with any of the plurality of time points, and
        storing the obtained first word group in a memory; and
    executing a third processing that includes
        receiving a first input through a first graphical user interface in a display screen of a display device, the first input indicating a first time point in a time axis,
        receiving a second input through a second graphical user interface in the display screen of the display device, the second input indicating a second time point in the time axis,
        displaying a third word group on a first area in the display screen of the display device, the third word group including one or more of words selected from among the first word group in the memory, each of the one or more of words included in the third word group being a word corresponding to the first time point indicated by the first input from among the one or more of words included in the first word group, and
        displaying a fourth word group on a second area in the display screen of the display device, the fourth word group including one or more of words selected from among the second word group in the memory, each of the one or more of words included in the fourth word group being a word corresponding to the second time point indicated by the second input from among the one or more of words included in the second word group.

2. The non-transitory computer-readable storage medium according to claim 1, wherein the third processing includes controlling a display mode for the third word included in the third word group and the fourth word included in the fourth word group in accordance with setting information, the setting information indicating weighting factors with respect to the first word group and the second word group.

3. The non-transitory computer-readable storage medium according to claim 2, wherein each of the weighting factors is determined in accordance with a height of an interest level of a first user or a second user.

4. The non-transitory computer-readable storage medium according to claim 2, wherein the display mode is a mode for displaying the third word and the forth word in sizes in accordance with the weighting factors.

5. The non-transitory computer-readable storage medium according to claim 2, wherein the display mode is a display mode for classifying the third word and the forth word into predetermined categories to be displayed in different colors.

6. The non-transitory computer-readable storage medium according to claim 1, wherein, in a case where there is a common word between the third word group and the fourth word group, the third processing includes displaying an indication regarding the common word included in both of the third word group and the fourth word group .

7. The non-transitory computer-readable storage medium according to claim 6, wherein the third processing includes displaying a link indicating a connection between a first position and a second position, the first position being a display position where the common word is displayed in the third word group, the second position being a display position where the common word is displayed in the fourth word group.

8. The non-transitory computer-readable storage medium according to claim 6, wherein the third processing includes selecting the common word from among words having weighting factors which satisfy a predetermined condition.

9. The non-transitory computer-readable storage medium according to claim 1, wherein the third processing includes additionally displaying a fifth word group in which each of the one or more of words is associated with a fifth time point.

10. A method performed by a computer, the method comprising:
executing, by a processor of the computer, a first processing that includes
obtaining a first word group with respect to a first person, the first word group including one or more of words each of which is associated with any of a plurality of time points, and
storing the obtained first word group in a memory;
executing, by a processor of the computer, a second processing that includes
obtaining a second word group with respect to a second person, the second word group including one or more of words each of which is associated with any of the plurality of time points, and
storing the obtained first word group in a memory; and
executing, by a processor of the computer, a third processing that includes
receiving a first input through a first graphical user interface in a display screen of a display device, the first input indicating a first time point in a time axis,
receiving a second input through a second graphical user interface in the display screen of the display device, the second input indicating a second time point in the time axis,
displaying a third word group on a first area in the display screen of the display device, the third word group including one or more of words selected from among the first word group in the memory, each of the one or more of words included in the third word group being a word corresponding to the first time point indicated by the first input from among the one or more of words included in the first word group, and
displaying a fourth word group on a second area in the display screen of the display device, the fourth word group including one or more of words selected from among the second word group in the memory, each of the one or more of words included in the fourth word group being a word corresponding to the second time point indicated by the second input from among the one or more of words included in the second word group.

11. An apparatus for information processing, the apparatus comprising:
a memory; and
a processor coupled to the memory and configured to
execute a first processing that includes
obtaining a first word group with respect to a first person, the first word group including one or more of words each of which is associated with any of a plurality of time points, and
storing the obtained first word group in a memory;
execute a second processing that includes
obtaining a second word group with respect to a second person, the second word group including one or more of words each of which is associated with any of the plurality of time points, and
storing the obtained first word group in a memory; and
execute a third processing that includes
receiving a first input through a first graphical user interface in a display screen of a display device, the first input indicating a first time point in a time axis,
receiving a second input through a second graphical user interface in the display screen of the display device, the second input indicating a second time point in the time axis,
displaying a third word group on a first area in the display screen of the display device, the third word group including one or more of words selected from among the first word group in the memory, each of the one or more of words included in the third word group being a word corresponding to the first time point indicated by the first input from among the one or more of words included in the first word group, and
displaying a fourth word group on a second area in the display screen of the display device, the fourth word group including one or more of words selected from among the second word group in the memory, each of the one or more of words included in the fourth word group being a word corresponding to the second time point indicated by the second input from among the one or more of words included in the second word group.

* * * * *